(12) United States Patent
Agesen et al.

(10) Patent No.: US 7,222,221 B1
(45) Date of Patent: May 22, 2007

(54) MAINTAINING COHERENCY OF DERIVED DATA IN A COMPUTER SYSTEM

(75) Inventors: Ole Agesen, Palo Alto, CA (US); Pratap Subrahmanyam, Sunnyvale, CA (US); Keith M. Adams, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 290 days.

(21) Appl. No.: 10/774,095

(22) Filed: Feb. 6, 2004

(51) Int. Cl.
*G06F 12/00* (2006.01)

(52) U.S. Cl. ............... 711/141; 711/100; 711/117; 711/118; 711/170; 711/210; 707/200; 707/201; 718/1; 718/104

(58) Field of Classification Search ............ 711/141, 711/100, 117, 118, 170, 210; 707/200, 201; 718/1, 104
See application file for complete search history.

(56) References Cited

U.S. PATENT DOCUMENTS

| | | | | |
|---|---|---|---|---|
| 5,479,630 A * | 12/1995 | Killian | ............... | 711/3 |
| 6,212,612 B1 * | 4/2001 | Turner | ............... | 711/170 |
| 6,397,242 B1 * | 5/2002 | Devine et al. | ............... | 718/1 |
| 6,421,745 B1 * | 7/2002 | James et al. | ............... | 710/34 |
| 6,658,538 B2 * | 12/2003 | Arimilli et al. | ............... | 711/141 |
| 6,738,869 B1 * | 5/2004 | Moran et al. | ............... | 711/145 |
| 6,961,806 B1 * | 11/2005 | Agesen et al. | ............... | 711/6 |
| 6,961,941 B1 * | 11/2005 | Nelson et al. | ............... | 719/319 |
| 7,000,080 B2 * | 2/2006 | Van Doren et al. | ............... | 711/143 |
| 2004/0117593 A1 * | 6/2004 | Uhlig et al. | ............... | 711/207 |

* cited by examiner

*Primary Examiner*—Stephen C. Elmore
*Assistant Examiner*—Daniel Kim
(74) *Attorney, Agent, or Firm*—Darryl A. Smith

(57) ABSTRACT

A computer system has secondary data that is derived from primary data, such as entries in a TLB being derived from entries in a page table. When an actor changes the primary data, a producer indicates the change in a set data structure, such as a data array, in memory that is shared by the producer and a consumer. There may be multiple producers and multiple consumers and each producer/consumer pair has a separate channel. At coherency events, at which incoherencies between the primary data and the secondary data should be removed, consumers read the channels to determine the changes, and update the secondary data accordingly. The system may be a multiprocessor virtual computer system, the actor may be a guest operating system, and the producers and consumers may be subsystems within a virtual machine monitor, wherein each subsystem exports a separate virtual central processing unit.

27 Claims, 14 Drawing Sheets

| PRODUCER TO CONSUMER PATCH CHANNEL (P2C PC) |||||| 
|---|---|---|---|---|---|
| PATCH # | PTBA | OFFSET | DER. VAL. | USEFUL? | IN USE? |
| PATCH 0 | PTBA 0 | OFFSET 0 | DER. VAL. 0 | USEFUL 0 | IN USE 0 |
| PATCH 1 | PTBA 1 | OFFSET 1 | DER. VAL. 1 | USEFUL 1 | IN USE 1 |
| PATCH 2 | PTBA 2 | OFFSET 2 | DER. VAL. 2 | USEFUL 2 | IN USE 2 |
| ⋮ | ⋮ | ⋮ | ⋮ | ⋮ | ⋮ |
| PATCH N | PTBA N | OFFSET N | DER. VAL. N | USEFUL N | IN USE N |

|  |  | CONSUMER ||||
|---|---|---|---|---|---|
|  |  | 399A | 399B | 399C | 399D |
| PRODUCER | 396A | A2A PC 398A | A2B PC 398B | A2C PC 398C | A2D PC 398D |
|  | 396B | B2A PC 398E | B2B PC 398F | B2C PC 398G | B2D PC 398H |
|  | 396C | C2A PC 398I | C2B PC 398J | C2C PC 398K | C2D PC 398L |
|  | 396D | D2A PC 398M | D2B PC 398N | D2C PC 398O | D2D PC 398P |

FIG. 10

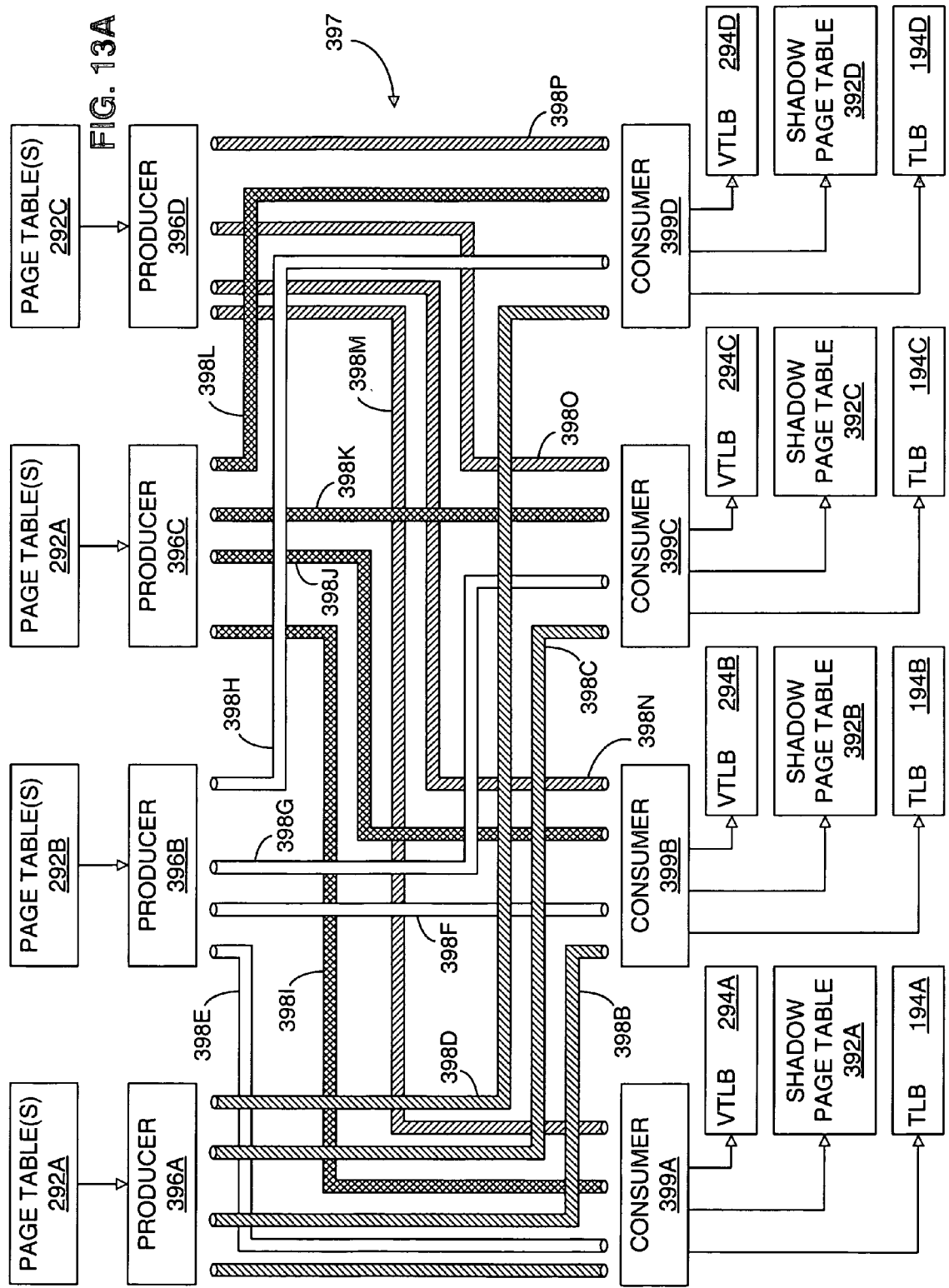

MAINTAINING COHERENCY OF DERIVED DATA IN A COMPUTER SYSTEM

BACKGROUND OF THE INVENTION

1. Field of the Invention

This invention relates to computer programs in general, and in particular, to a method and related apparatus for maintaining coherency of secondary data in a computer system.

2. Description of the Related Art

This invention may be implemented in a wide variety of circumstances in a wide variety of computer systems. To simplify this description of the invention, however, a particular preferred embodiment of the invention will be described in detail, and comments will be added to indicate some other possible implementations or variations of the invention. Persons of skill in the art will recognize still other possible implementations and variations.

The preferred embodiment of the invention is implemented in a virtual computer system comprising multiple physical processors and multiple virtual processors, although the invention may also be advantageously implemented in a uniprocessor system. The multiple physical and virtual processors of the preferred embodiment may also or alternatively comprise multiple logical processors, such as those found in processors that include simultaneous multi-threading, which is known as "Hyper-Threading" in terminology introduced by Intel Corporation. Logical processors and simultaneous multi-threading technology will be described in greater detail below. The preferred embodiment is used to maintain TLB (Translation Lookaside Buffer) coherency in a multiprocessor virtual computer system. More specifically, the virtual computer system in which the preferred embodiment is implemented comprises one or more virtual machine monitors (VMMs) running on a physical, multiprocessor computer system, with each VMM supporting a virtual machine (VM). Accordingly, this background section provides introductions to the technologies of virtual memory systems, multiprocessor systems and simultaneous multi-threaded CPUs, TLB coherency issues and techniques, and virtual machine monitors. Next, this background section provides a description of a general virtualized computer system in which the invention may be implemented.

Virtual Memory Systems

The design and use of virtual memory systems are well known in the art, and there are numerous books and other technical references available on the subject. This invention may be implemented in various different computer systems, using various different virtual memory techniques. For purposes of an example only, the invention will be described in relation to a virtual memory system based on the x86 architecture from Intel Corporation. The invention also applies to other computer systems with other address translation mechanisms. This architecture is described in the IA-32 Intel Architecture Developer's Manual, a three-volume set, which is currently available on the Internet website of Intel Corporation, and which is hereby incorporated by reference. Volume 3 of that set, the Software Developer's Manual, is particularly informative regarding the virtual memory functions of the architecture.

FIG. 1 is a block diagram of the major functional components of a general virtual memory system in a computer. The system comprises a CPU 10, a memory management unit (MMU) 12, a TLB 14, a random access memory (RAM) 16, a plurality of page tables 18, an operating system (OS) 22, a software memory manager (S-MMU) 24, a hard disk drive 20 and a direct memory access (DMA) controller 21. Each of the functional units illustrated in FIG. 1 may be implemented by conventional components of the well-known personal computer (PC) standard architecture. The CPU 10 may also be called a processor. The RAM 16 may also be called a primary memory, while the hard drive 20 may be called a secondary memory. Also, the MMU 12 and the S-MMU 24 may be considered parts of a more general memory management unit, in which the S-MMU 24 is the software that controls the hardware MMU 12. The CPU 10 and the MMU 12 may be combined within a single integrated circuit (IC) component, or they may be separate components. Also, the TLB 14 may be contained within the same IC component as the MMU 12, or it may be a separate device.

The most basic function of the CPU 10 is to execute computer programs, including the OS 22. The computer programs are generally stored on the hard drive 20 and loaded into the RAM 16 for execution. The CPU 10 issues memory read commands to retrieve instructions of the computer programs from the RAM 16 and then executes the retrieved instructions. The execution of instructions requires a myriad of other functions too, including reading data from and writing data to the RAM 16. For example, an instruction executed by the CPU 10 may require an operation to be performed on an operand, which may be located in the RAM 16, or the instruction may require that a value be written to a stack, which may also be located within the RAM 16. All information stored in the RAM 16 may be called data, whether the data consists of instructions, operands, stack data or other types of data. At times, however, a distinction may be drawn between different types of data. In addition, the term "computer program" will generally include instructions, operands and the associated stack.

A computer program is loaded from the hard drive 20 into the RAM 16 for execution because fetching information from the RAM 16 is much quicker than from the hard drive 20, which enables the CPU 10 to execute the program much more quickly. Earlier computer systems would load an entire computer program into the RAM 16 for execution, including providing additional RAM required by the program during execution, such as for a data stack. However, RAM is relatively expensive in comparison to the cost of other data storage devices, such as disk drives. As a result, computer systems are often designed with a limited amount of RAM, in comparison to the address space of the system, especially in systems that use 64-bit addressing. This gives rise to various situations in which a computer program requires more memory space than is available in the RAM 16. A simple example of such a situation is when a computer program is simply larger than the RAM 16 of the system on which the program is to run. Another example is in a multiprocessing system, when the sum of the memory required by all of the executing threads and the OS 22 exceeds the amount of RAM 16 in the computer system. Virtual memory techniques may be used to enable the execution of a computer program in such a situation where the RAM 16 that is available for use is less than the total amount of memory required by a computer program.

Virtual memory techniques may be implemented, for example, using a combination of hardware and software. The software portion of such an implementation may be provided by the S-MMU 24 of the OS 22 of FIG. 1, while much of the hardware functionality may be provided by the MMU 12. The MMU 12 may be included, along with the CPU 10, within a single microprocessor device, such as an Intel Pentium microprocessor, or the MMU 12 may be a separate device. Virtual memory techniques give the appearance, to a computer program, that there is more RAM available than is really the case. The computer program is provided with a virtual address space, which contains all of its instructions, data and stack. The virtual address space is generally larger than the available RAM 16, but the computer program may use the entire virtual address space as if it were all contained in the RAM 16. The virtual address space may have various different types of organization, such as linear or segmented. At any given time, one or more parts of the computer program will be in the RAM 16 while one or more other parts of the computer program will not be in the RAM 16, but will be stored on the hard drive 20. If the computer program attempts to use a part of its address space that is currently not contained in the RAM 16, the S-MMU 24 will typically transfer the required part of the computer program from the hard drive 20 to the RAM 16.

To implement a virtual memory system, a computer program may be divided into a number of units called pages. For this discussion, assume a 4 kilobyte (Kbyte) page, which is one possible page size in the x86 architecture. Some of the pages of the computer program are loaded into the RAM 16, while others are not, depending on the amount of the RAM 16 that is available to the computer program. Also, the pages that are loaded into the RAM 16 may not be loaded contiguously. Typically, a particular page of the computer program on the hard drive 20 could be loaded into any available page within the RAM 16.

During execution of a computer program or process, the CPU 10 generates addresses within the virtual address space of the computer program or process, for reading data from and writing data to the RAM 16. As used herein, a process is generally an instance of a computer program. The addresses generated by the CPU 10 may be called virtual addresses or linear addresses. However, the virtual addresses cannot be directly applied to the RAM 16 in a virtual memory system to access the desired memory locations. Instead, the virtual addresses must first be translated into corresponding physical addresses within a physical address space. The physical address space comprises the addresses that are used to access specific memory locations within the RAM 16. The MMU 12 and the S-MMU 24 have primary responsibility for translating or mapping addresses from the virtual address space to the physical address space. When the CPU 10 attempts to access data from the computer program that resides on a page of the program that is not currently loaded into the RAM 16, the MMU 12 determines that the page is not resident in the RAM 16, a page fault occurs and a trap to the OS 22 ensues. The S-MMU 24 subsequently transfers the required page from the hard drive 20 into the RAM 16. After the page transfer is complete, execution of the computer program resumes at the same instruction that resulted in the page fault. This time, however, the MMU 12 will determine that the page is loaded into the RAM 16 and the memory access will be completed successfully. If there is not enough available space in the RAM 16 for loading the required page during a page fault, the S-MMU 24 typically ejects another page from the RAM 16, and the space that the ejected page was occupying is freed up for loading the new page. If the page that is being ejected has been modified in the RAM 16 since it was loaded from the hard drive 20, then it is written back to the hard drive 20 before its memory space is used for the new page.

As described in greater detail below, the MMU 12 initially uses the page tables 18, located within the RAM 16, to translate virtual addresses into physical addresses. In this process, when the MMU 12 receives a virtual address from the CPU 10 for a memory read or write, the MMU 12 must first perform at least one memory read within the page tables 18 just to determine the corresponding physical address. The MMU 12 must then perform another memory access to complete the read or write required by the CPU 10. If the MMU 12 had to access the page tables 18 for every memory access from the CPU 10, using the virtual memory system would add at least one extra memory cycle to each memory access. In some virtual memory systems, multiple memory accesses are required to map a virtual address to a physical address, using the page tables 18. The added memory cycles would slow down the execution of instructions, which would reduce the overall processing power of the computer system. The primary purpose of the TLB 14 is to reduce the number of additional memory accesses that are required to implement the virtual memory system. The TLB 14 is basically a cache for page table entries and typically is located within the MMU 12. Fortunately, when a CPU 10 is executing a computer program, most of its memory accesses will be to a limited number of pages within the RAM 16. At any given time, for a particular program, the CPU 10 will typically access one or a few pages of code, one or a few pages of data and one or a few pages for the stack, depending on the page size used.

At this point, it is useful to discuss page numbers. As described above, the virtual address space of a computer program or a process is divided into a number of pages. Each of these pages can be numbered consecutively, resulting in virtual page numbers. In the same way, the physical address space of the RAM 16 can be divided into pages as well. These pages can also be numbered consecutively, resulting in physical page numbers. Now, a virtual address can be viewed as specifying a virtual page number in the upper bits and an offset within that page in the lower bits. In the same way, a physical address can be viewed as a physical page number combined with an offset into that physical page. For example, in a system having 32-bit addresses and a 4 Kbyte page size, such as an x86 system, the upper 20 bits of an address can be viewed as a page number and the lower 12 bits can be viewed as an offset within a given page. Then, so long as both virtual pages and physical pages begin at an address that is a multiple of the 4 Kbyte page size, the address translation process can be viewed as converting the upper address bits from a virtual page number to a physical page number, with the lower address bits remaining unchanged as the offset into the respective pages.

The MMU 12 uses the page tables 18 to perform this translation from virtual page numbers to physical page numbers. When the MMU 12 receives a virtual address from the CPU 10, the MMU 12 reads the virtual page number from the upper address bits of the address. The MMU 12 then reads information from the page tables 18 relating to the desired virtual page number. First, the page tables 18 will indicate whether the virtual page number is currently loaded into the RAM 16. If the virtual page is not loaded into the RAM 16, a page fault is generated and the required virtual page is loaded into the RAM 16 as described above. If the virtual page is loaded into the RAM 16, the page tables 18 will also indicate the physical page number that corresponds to the virtual page number. The MMU 12 then uses the retrieved physical page number, along with the offset from the virtual address to access the desired location within the RAM 16. In addition, the MMU 12 writes the virtual page number and the physical page number into an entry in the TLB 14, indicating the mapping between the pages. In other systems, the S-MMU 24 may be responsible for loading such mappings into the TLB 14. Accessing the page tables 18 in this manner to determine a mapping from a virtual page number to a physical page number is called walking the page tables 18. Now that the mapping from the virtual page number to the physical page number has been written into the TLB 14, if a subsequent memory access is to the same virtual page number, the MMU 12 can find the appropriate mapping in the TLB 14 within the MMU 12, without having to access the page tables 18 in the RAM 16.

The MMU 12 is designed such that the access to the TLB 14 is much quicker than an access to the page tables 18. The TLB 14 can typically only hold a relatively small number of page mappings, such as 8 to 64 entries, in comparison to the size of the page tables 18. As a result, entries must be evicted from the TLB 14 from time to time. Typically, when the MMU 12 walks the page tables 18 to determine a new mapping, the MMU 12 will evict an existing entry in the TLB 14 to make space to enter the new mapping. Thus, when the MMU 12 receives a virtual address from the CPU 10, the MMU 12 may first access the TLB 14 to determine if the desired mapping is there. If the mapping is not in the TLB 14, then the MMU 12 must perform a page table walk, as described above and in greater detail below.

FIG. 2A shows a 32-bit virtual address 30, comprising a 10-bit page directory entry (PDE) 30A, a 10-bit page table entry (PTE) 30B and a 12-bit offset 30C. FIG. 2B illustrates the structure and operation of the page tables of the x86 architecture, as a more detailed example. FIG. 2B also shows a page directory 40 with 1024 page table base address (PTBA) entries 42, including one specific PTBA entry 42X. FIG. 2B also shows a plurality of page tables 50A, 50X and 50N. These page tables, along with other page tables that are not illustrated, will be collectively referred to as page tables 50. This convention, of using a common numeric portion to refer collectively to all items having alphanumeric references containing the same numeric portion, is used throughout this description. As shown relative to the page table 50X, each of the page tables 50 comprises 1024 physical page base address (PPBA) entries 52. Page table 50X includes one specific PPBA entry 52X. FIG. 2B also shows a plurality of physical pages 60, including the physical pages 60A, 60X and 60N. As shown relative to the physical page 60X, each of the physical pages 60 comprises 4096 addressable bytes 62. Physical page 60X includes one specific byte 62X. Each of the physical pages 60, the page tables 50 and the single page directory 40 reside in the RAM 16. Each of the physical pages 60 includes 4096 bytes, or 4 Kbytes. As described above, the physical pages 60 and the virtual pages of the example in this description include 4 Kbytes of data. Each of the 1024 PTBA entries 42 in the page directory 40 comprises 32 bits, or 4 bytes. Thus, the page directory 40 also constitutes a full 4 Kbyte page in the RAM 16. Each of the 1024 PPBA entries 52 in the page tables 50 also comprises 32 bits. So, each of the page tables 50 also constitutes a full 4 Kbyte page in the RAM 16.

When the MMU 12 receives a virtual address 30 from the CPU 10, the MMU 12 may first check to see if there is an entry in the TLB 14 that provides a mapping from the virtual page number to a corresponding physical page number. The combination of the PDE 30A and the PTE 30B is considered the virtual page number 30AB. In this architecture, the TLB 14 maps 20-bit virtual page numbers to 20-bit physical page numbers. So, the MMU 12 checks whether there is a valid entry in the TLB 14 matching the virtual page number 30AB. If there is, the MMU 12 uses this entry to obtain the desired mapping to a physical page 60. If there is no matching entry in the TLB 14, the MMU 12 must walk the page tables 18. In the x86 architecture, the page directory 40 may be considered a page table 18, as well as the page tables 50. To walk the page tables 18, the MMU 12 first reads a 20-bit value from a control register CR3 in some modes of operation. This 20-bit value is used as the upper 20 bits of a 32-bit address that points to the base of the page directory 40. The lower 12 bits of this address are set to zero. Thus, the page directory 40 must begin at an address that is a multiple of the 4 Kbyte page size. The page tables 50 and the physical pages 60 must also begin at an address that is a multiple of the 4 Kbyte page size for the same reason.

Once the base address of the page directory 40 is determined, the PDE 30A is used as an index into the 1024-entry table of the page directory 40. More specifically, the 20 bits from the control register CR3 are used as the upper address bits, the 10 bits from the PDE 30A are used as the next lower address bits, and the last two address bits are set to 0 to form a memory address, which addresses the PTBA entry 42X. As illustrated in FIG. 2B, the control register CR3 points to the beginning of the page directory 40, while the PDE 30A points to the PTBA entry 42X. One bit of the PTBA entry 42X indicates whether the PTBA entry 42X is a valid entry. If it is not a valid entry, a page fault results, which may indicate an error condition in the S-MMU 24 or in the running application. If the entry is valid, a 20-bit value from the PTBA entry 42X is used as the upper bits of a base address for the page table 50X. The PTE 30B is used as an index into the 1024-entry table of the page table 50X. As shown in FIG. 2B, the page table base address entry 42X points to the base of the page table 50X, while the PTE 30B points to the PPBA entry 52X. One bit of the PPBA entry 52X indicates whether the virtual page number 30AB is currently loaded into the RAM 16. If the virtual page number 30AB is not currently loaded into the RAM 16, a page fault results and the required virtual page is loaded into the RAM 16, as described above. If the virtual page number 30AB is loaded into the RAM 16, a 20-bit value from the PPBA entry 52X is used as the upper address bits of a base address for the page table 60X for the current memory access. The offset 30C is now used as an index into the physical page 60X to identify a specific byte address 62X for the memory access. In other words, the 20 bits from the PPBA entry 52X are combined with the 12 bits from the offset 30C to form a 32-bit physical address that is used to perform the memory access requested by the CPU 10. As shown in FIG. 2B, the PPBA entry 52X points to the base of the physical page 60X, while the offset 30C points to the required byte address 62X for the memory access.

Generally, the S-MMU 24 of the OS 22 is responsible for creating and maintaining the page tables 18 for the use of the MMU 12. Either the MMU 12 or the S-MMU 24 is generally responsible for loading values into the TLB 14 for recently obtained mappings between virtual page numbers and physical page numbers. Values may be flushed from the TLB 14 either by the MMU 12 or by the S-MMU 24, or possibly by other software within the RAM 16, such as user-level application programs. Each entry within a page table 18 generally contains, in addition to a physical page number, a few other bits for indicating whether the entry is valid, what types of access are allowed for the page, whether the page has been modified and/or referenced since it was loaded into the RAM 16 and whether caching is disabled for the page. An entry within the TLB 14 generally contains a virtual page number and a physical page number, as well as a few additional bits to indicate whether the entry is valid, whether the page has been modified since being loaded into the RAM 16 and what types of access are allowed for the page. When a memory access is performed, if the MMU 12 determines that the virtual page is loaded into the RAM 16, the MMU 12 also accesses these additional bits of the entry within either the page tables 18 or the TLB 14, to determine if the requested memory access is permitted. For example, the access bits may indicate that only read accesses are permitted. If the CPU 10 attempts to write data to such a location, the MMU 12 will generate a page fault.

When a mapping for a particular virtual page number is not contained within the TLB 14 and a page table walk is performed, the MMU 12 typically evicts an entry from the TLB 14 to free up space for a new entry for the current mapping. The virtual page number will be written into the newly available entry in the TLB 14, along with the physical page number that was just determined. The additional bits within the entry of the TLB 14 are typically copied from the corresponding additional bits in the corresponding page table entry. When an entry in the TLB 14 is evicted, a bit indicating whether the page has been modified is typically copied from the entry of the TLB 14 to the corresponding entry in the page table 18. Also, if the S-MMU 24 removes a virtual page from the RAM 16 for which there is an entry in the TLB 14, the S-MMU 24 must modify the entry in the TLB 14 to indicate that the mapping is no longer valid. Other programs may also be allowed to indicate that an entry of the TLB 14 is invalid, including possibly user-level applications. The x86 architecture provides an instruction, Inylpg (virtual address), for this purpose, although the Inylpg instruction is usually restricted for use only by kernel level code. The x86 architecture is defined such that, if an entry in the TLB 14 is set as invalid, the MMU 12 will walk the page tables to determine a mapping for the virtual address. However, if an entry in the TLB 14 is not set as invalid, the MMU 12 may use the TLB 14 to obtain a mapping, or the MMU 12 may walk the page tables to determine the mapping. The x86 architecture also provides an instruction for flushing the entire contents of the TLB 14. As described above, entries within the TLB 14 may also be evicted by the MMU 12 to free up space for a new mapping for a new virtual address. Thus, an entry in the TLB 14 may be created for a specific virtual page number in response to a first access to that virtual page. During a subsequent access to the same virtual page, if the entry in the TLB 14 has been evicted by the MMU 12 in between the two accesses, a page table walk will nonetheless be required. This situation is described as a leakage of the TLB 14.

Multiprocessor Systems and Simultaneous Multi-Threaded CPUs

Multiprocessor systems are also well known in the art and there are various architectures currently available. FIG. 3 illustrates one general architecture for a multiprocessor system. FIG. 3 shows a shared primary memory 16B, an OS 22B, an S-MMU 24B, a plurality of page tables 18B, and a shared secondary memory 20B. These functional units perform the same basic functions as the corresponding functional units shown in FIG. 1, but they may need to be modified to perform these functions in a multiprocessor environment. There are various types of operating systems 22B for use in multiprocessor systems. Some multiprocessor operating systems 22B use a single operating system image to manage the entire set of processors in concert. In other multiprocessor systems, the system hardware provides a physical partitioning of the system, allowing a different instance of a multiprocessor operating system 22B to manage each partition. In the case of a multiprocessor OS 22B comprising a separate instance for each CPU, the separate instances of the OS 22B may be executed in separate private memories associated with each of the multiple CPUs. The shared primary memory 16B may be the same type of memory as the RAM 16, except perhaps larger, and the shared secondary memory 20B may be the same as the hard drive 20, except perhaps larger. The page tables 18B may be the same as the page tables 18, except that there may be more sets of page tables 18B because of the multiple CPUs.

FIG. 3 also shows a first processor (such as a microprocessor) 9A, having a first CPU 11A, a first MMU 13A and a first TLB 15A. The microprocessor 9A is also connected to a first private memory 17A. FIG. 3 also shows a second processor (such as a microprocessor) 9B, having a second CPU 11B, a second MMU 13B and a second TLB 15B. The microprocessor 9B is also connected to a second private memory 17B. The multiprocessor system of FIG. 3 may also have additional microprocessors 9 and associated private memories 17. The microprocessors 9 may be, for example, based on the x86 architecture. In addition, each of the private memories 17 is optional.

In a single-processor system, there may be a single set of page tables 18 or there may be multiple sets of page tables 18. Each process could have its own set of page tables 18 or there could be some sharing of page tables 18. In a multiprocessor system, there could be page tables 18B in the shared primary memory 16B, in one or more of the private memories 17, or both, and any of these page tables 18B could be shared between multiple processes or exclusive to a single process. As another alternative to the system illustrated in FIG. 3, one or more TLBs 15 could be shared among multiple CPUs 11. One example of a multiprocessor system having a shared TLB 15 is illustrated in FIG. 4 and described below.

The virtual memory system implemented in the system of FIG. 3 can be functionally similar to the virtual memory system described above in connection with FIGS. 1 and 2. More specifically, the TLBs 15 and the page tables 18B can have the same basic structure and functionality as the TLB 14 and the page tables 18, respectively, and the MMUs 13 and the S-MMU 24B can control and use the TLBs 15 and the page tables 18B in the same general manner that the MMU 12 and the S-MMU 24 control and use the TLB 14 and the page tables 18. If there is no sharing of the TLBs 15 or the page tables 18B between multiple CPUs 11, then the virtual memory system of FIG. 3 can be functionally the same as the virtual memory system of FIGS. 1 and 2, but with a separate instance of the virtual memory system for each of the CPUs 11. However, if there is any sharing of the TLBs 15 or the page tables 18B between the multiple CPUs 11, the virtual memory system gets more complicated. The following discussion will focus on a multiprocessor system containing only two CPUs 11, for simplicity, although it also applies to systems with more CPUs 11.

The discussion also applies to systems that have only one physical CPU, if the CPU implements simultaneous multi-threading techniques. Simultaneous multi-threading techniques are known in the art and are becoming more prevalent, especially in high-performance CPUs, such as the Xeon microprocessor from Intel Corporation. In a CPU that implements simultaneous multi-threading, multiple instruction streams are executed simultaneously. With multiprogramming or multithreading techniques, in contrast, different instruction streams are executed during separate time slices. A CPU that does not provide simultaneous multi-threading can generally be modeled as an interpreter loop, in which the CPU repeatedly fetches an instruction, fetches any required operands, performs an operation and does something with the result of the operation, such as writing the result to memory, before moving on to fetch the next instruction. A simultaneous multi-threaded CPU, in contrast, can be modeled as multiple independent interpreter loops running concurrently. Effectively, the single physical CPU core provides the capabilities of multiple logical CPUs. However, a simultaneous multi-threaded processor may have only a single TLB, or it may have multiple TLBs. For the purposes of this invention and the discussion below, a simultaneous multi-threaded processor, having multiple logical CPUs but only one TLB, is functionally equivalent to a multiprocessor system having multiple physical CPUs and a single, shared TLB. This invention and the following discussion may apply to any computer system in which multiple processes or threads are executing simultaneously on multiple physical or logical CPUs, and the multiple processes or threads share a common TLB or page table. In fact, as will become apparent below, this invention may even apply in a system having a separate TLB and a separate set of page tables for each process or thread, so long as at least one process or thread has write access to the page tables of at least one other process or thread, even if such access is provided inadvertently, such as due to a system software error, for example.

FIG. 4 illustrates another example architecture for a multiprocessor computer system. Specifically, FIG. 4 shows a first CPU 11C, a second CPU 11D, an MMU 13C, a shared TLB 15C, a shared primary memory 16C, an OS 22C, an S-MMU 24C, a set of page tables 18C, and a shared secondary memory 20C. Each of the CPUs 11C and 11D may be either physical or logical, and there may also be additional physical and/or logical CPUs 11. The MMU 13C and the TLB 15C are shared between the CPUs 11C and 11D. Otherwise, the functional units illustrated in FIG. 4 may be equivalent to the corresponding functional units illustrated in FIG. 3.

TLB Coherency Issues and Techniques

Referring again to the multiprocessor system of FIG. 3, suppose that the CPU 11A is executing a first process and the CPU 11B is executing a second process. The system of FIG. 3 implements a virtual memory system, with some pages of the virtual address space of the first process loaded into primary memory 16B and others remaining in the secondary memory 20B. Suppose, for the moment, that the first and second processes share a common set of page tables 18B. The page tables 18B indicate, for each virtual page, whether it is loaded into the primary memory 16B or whether it remains in the secondary memory 20B. The page tables 18B also indicate, for each virtual page loaded into the primary memory 16B, the corresponding physical page number into which the virtual page is loaded. The TLB 15A may also contain one or more entries indicating mappings between virtual pages and physical pages of the primary memory 16B.

Suppose further that the first process executes a first instruction that accesses a first memory location on a first virtual page that is currently loaded into a first physical page. Suppose that the MMU 13A walks the page tables 18B to determine a mapping between the first virtual page and the first physical page, and stores this mapping in the TLB 15A. Now suppose that the second process changes the page tables 18B, or performs some action that causes the page tables 18B to be changed. For example, the second process may attempt to access a second virtual page that is not currently loaded into the primary memory 16B, causing a page fault. In response to the page fault, the S-MMU 24B loads the second virtual page from the secondary memory 20B into the primary memory 16B. Suppose that the S-MMU 24B loads the second virtual page from the secondary memory 20B into the first physical page of the primary memory 16B, replacing the first virtual page. The S-MMU 24B updates the page tables 18B to indicate that the second virtual page is now loaded into the primary memory 16B and is mapped to the first physical page, and to indicate that the first virtual page is no longer loaded into the primary memory 16B.

Now suppose that the first process executes a second instruction that again accesses the first memory location on the first virtual page, or some other memory location on the first virtual page. If the MMU 13A accesses the TLB 15A to determine a mapping for the first virtual page, the previously stored mapping will indicate that the first virtual page is mapped to the first physical page. The MMU 13A would then retrieve the contents of the corresponding memory location within the first physical page and provide this data to the CPU 11A for executing the second instruction. However, the data retrieved by the MMU 13A is actually from the first physical page, instead of from the second physical page as indicated in the page tables. Thus, the CPU 11A would execute the second instruction based on incorrect data, possibly corrupting the data for the first process, the second process, or both. If the first virtual page contained code for the first process, as opposed to operand data or stack data, so that the attempted memory access were an instruction fetch, then the CPU 11A would attempt to execute whatever data is retrieved by the MMU 13A. If the second virtual page happens to contain operand or stack data, then the CPU 11A would nonetheless attempt to interpret the returned data as an instruction and try to execute the interpreted instruction. This situation would also likely lead to corrupted data, or worse.

This situation is referred to as an incoherent TLB. The TLB 15A operates as a cache for the virtual addressing data contained in the page tables 18B. If an entry in a page table 18B is loaded into the TLB 15A, and then the same entry in the page table 18B is modified, then the corresponding entry in the TLB 15A should generally be updated accordingly to maintain coherency with the page table 18B, or at least invalidated to avoid an incoherency.

Multiprocessor systems, as well as uniprocessor systems, generally provide methods to avoid TLB incoherencies. One common technique in a multiprocessor system, referred to as a "TLB shootdown," enables the OS 22B to cause the mapping between the first virtual page and the first physical page in the TLB 15A to be flushed or invalidated. First, the OS 22B, executing on the CPU 11B, may coordinate with the CPU 11A to bring the CPU 11A into a safe state, so that the CPU 11A is not using the first virtual page or the page table entry mapping the first virtual page to the first physical page, although this step may be omitted in many cases. Next, the OS 22B, again executing on the CPU 11B, switches the first physical page to contain the second virtual page instead of the first virtual page and modifies the appropriate entries in the page table 18B. Next, the OS 22B causes the CPU 11A to flush or invalidate the entry in the TLB 15A that maps the first virtual page to the first physical page. In the x86 architecture, for example, the OS 22B may cause the CPU 11A to execute an Inylpg instruction, specifying the page number for the first virtual page. Now, when the second instruction is executed by the CPU 11A, causing the second access to the first memory location, the MMU 13A does not find a mapping for the first virtual page in the TLB 15A and is forced to walk the page tables 18B. The MMU 13A now determines that the first virtual page is no longer loaded into the primary memory 16B, as appropriate.

Virtual Machine Monitors

A virtual machine monitor (VMM) is a piece of software that runs on top of the hardware of a computer system having a first hardware platform and creates an abstracted or virtualized computer system having a second hardware platform. The second hardware platform, or virtualized platform, may be the same as, similar to, or substantially different from, the first hardware platform. The VMM exports all of the features of the virtualized platform, to create a virtual machine (VM) that is functionally equivalent to an actual hardware system implementing the second hardware platform. The VMM generally performs all of the functions that would be performed by a physical implementation of the virtualized hardware platform, to achieve the same results. For example, a VMM generally implements a virtual memory system that is functionally equivalent to the virtual memory system that would result from a physical implementation of the virtualized platform. Various designs for such VMMs are well known in the art, and this invention may be implemented in any such design.

An OS designed to run on a computer system having the virtualized hardware platform can be loaded on top of the VMM, and the OS should not be able to determine that it is not running directly on an actual hardware system implementing the virtualized hardware platform. Therefore, in the case where the virtualized hardware platform is the same as the physical hardware platform, the OS can be loaded directly onto the actual computer system or on top of the VMM, and the OS would not be able to determine whether the machine on which it is running is the physical machine or the virtual machine. Drivers and other system software that are designed for computer systems having the virtualized hardware platform can also be loaded onto the VMM. An OS running on a VMM, along with drivers and other system software, is called a guest OS. In addition, application programs that are designed to operate on the guest OS may also be loaded onto the VMM. An application program loaded onto the VMM is called a guest application.

As one example of a VMM implementation, a VMM may run on an x86 computer system, and it may virtualize an x86 system. In this case, the VMM creates a VM that is compatible with the x86 architecture. Any operating system that can run on an x86 system may be loaded on top of the VMM. For example, a Windows OS from Microsoft Corporation, such as the Windows XP OS, may be loaded as the guest OS on top of the VMM. Application programs that are designed to operate on a system running the Windows XP OS can then also be loaded onto the VMM. The guest OS and the application programs will execute just as if they were loaded directly onto the underlying physical x86 system.

VMMs have also been designed to operate on multiprocessor systems, and to virtualize multiprocessor systems. For example, one or more VMMs may execute on the hardware platform illustrated in FIG. 3, and may create a VM having the same hardware architecture. As described above, the VMMs should generally be functionally equivalent to the virtualized hardware platform. Of particular relevance to this invention, the VMMs should generally provide a virtual memory system that is functionally equivalent to the virtual memory system of the virtualized platform. Thus, the VMMs should virtualize one or more MMUs and one or more TLBs that are functionally equivalent to the MMUs and TLBs of an actual physical implementation of the virtualized hardware platform. The virtualized MMUs and TLBs should interact with the S-MMU of the guest OS and with the guest applications in the same manner as the corresponding physical MMUs and TLBs would interact with the S-MMU and the guest applications. In particular, the VMMs should provide the same safeguards against virtual memory conflicts, which could result from shared TLBs, shared page tables and/or a shared primary memory, as are provided by a physical implementation of the virtualized platform. For example, suppose a VMM, or a set of VMMs, were designed to virtualize the hardware platform illustrated in FIG. 3, including the function described above in which the second CPU 11B is able to initiate a TLB shootdown to cause the first CPU 11A to flush or invalidate a mapping in the first TLB 15A. Such a VMM would virtualize the first microprocessor 9A, the second microprocessor 9B and the first TLB 15A such that the second virtual CPU could communicate with the first virtual CPU causing the first virtual CPU to flush the mapping in the virtual TLB.

General Virtualized Computer System

FIG. 5 illustrates, in part, the general configuration of a virtual computer system 700, including a virtual machine 200, which is installed as a "guest" on a "host" hardware platform 100. As FIG. 5 shows, the hardware platform 100 includes one or more processors (CPUs) 110, system memory 130, and one or more local storage devices, which typically includes a local disk 140. The system memory is typically some form of high-speed RAM, whereas the disk (one or more) is typically a non-volatile, mass storage device. The hardware 100 also typically includes other conventional mechanisms such as a memory management unit (MMU) 150 and various registers 160. The hardware 100 may also include one or more interface cards for interfacing with external devices, computers, systems and/or networks. For example, the hardware 100 may include a data interface 170 for connecting to an external data storage system or network and/or a network interface 180 for connecting to a computer network.

Each VM 200 typically includes at least one virtual CPU 210, at least one virtual disk 240, a virtual system memory 230, a guest operating system 220 (which may simply be a copy of a conventional operating system), and various virtual devices 280, in which case the guest operating system ("guest OS") includes corresponding drivers 224. All of the components of the VM may be implemented in software using known techniques to emulate the corresponding components of an actual computer.

One or more guest applications 260 may also be loaded into the VM 200. Executable files will be accessed by the guest OS from a virtual disk or virtual memory, which may simply be portions of an actual physical disk or memory allocated to that VM. Once an application is installed within the VM, the guest OS retrieves files from the virtual disk just as if they had been pre-stored as the result of a conventional installation of the application. The design and operation of virtual machines is well known in the field of computer science.

A VMM, or some such interface, is generally required between a VM and the underlying host platform (in particular, the CPU), which is responsible for actually executing VM-issued instructions and transferring data to and from the actual memory and storage devices. In FIG. 5, a VMM is shown as component 300. A VMM is usually a thin piece of software that runs directly on top of a host, or directly on the hardware, and virtualizes the resources of the physical host machine. Among other components, the VMM therefore usually includes device emulators 330, which may constitute the virtual devices 280 that the VM 200 accesses.

The VMM also usually tracks and either forwards (to some form of operating system) or itself schedules and handles all requests by its VM for machine resources, as well as various faults and interrupts. A mechanism known in the art as an exception or interrupt handler 355 is therefore included in the VMM. As is well known, such an interrupt/exception handler normally includes an interrupt descriptor table (IDT), or some similar table, which is typically a data structure that uses information in the interrupt signal to point to an entry address for a set of instructions that are to be executed when the interrupt/exception occurs. FIG. 5 also shows, within the VMM 300, a patch producer 396 and a patch consumer 399, which will be described below in connection with the preferred embodiment of the invention.

Although the VM (and thus the user of applications running in the VM) cannot usually detect the presence of the VMM, the VMM and the VM may be viewed as together forming a single virtual computer. They are shown in FIG. 5 as separate components for the sake of clarity. Moreover, the various virtualized hardware components such as the virtual CPU(s) 210, the virtual memory 230, the virtual disk 240, and the virtual device(s) 280 are shown as being part of the VM 200 for the sake of conceptual simplicity—in actual implementations these "components" are usually constructs or emulations exported to the VM by the VMM. For example, the virtual disk 240 is shown as being within the VM 200. This virtual component, which could alternatively be included among the virtual devices 280, may in fact be implemented as one of the device emulators 330 in the VMM. The device emulators 330 emulate the system resources for use within the VM. These device emulators will then typically also handle any necessary conversions between the resources as exported to the VM and the actual physical resources.

As in most modern computers and as described above, the address space of the memory 130 is partitioned into pages (for example, in the Intel x86 architecture) or other analogous units. Applications then address the memory 130 using virtual addresses (VAs), which include virtual page numbers (VPNs). The VAs are then mapped to physical addresses (PAs) that are used to address the physical memory 130. VAs and PAs have a common offset from a base address, so that only the VPN needs to be converted into a corresponding physical page number (PPN). Similar mappings are used in other architectures where relocatability is possible.

An extra level of addressing indirection is typically implemented in virtualized systems in that a VPN issued by an application 260 in the VM 200 is remapped twice in order to determine which page of the hardware memory is intended. The first mapping is provided by a mapping module within the guest OS 220, which translates the guest VPN (GVPN) into a corresponding guest PPN (GPPN) in the conventional manner. The guest OS therefore "believes" that it is directly addressing the actual hardware memory, but in fact it is not.

Of course, a valid address to the actual hardware memory must ultimately be generated. A memory management module 350, located typically in the VMM 300, therefore performs the second mapping by taking the GPPN issued by the guest OS 220 and mapping it to a hardware (or "machine") page number PPN that can be used to address the hardware memory 130. This GPPN-to-PPN mapping may instead be done in the main system-level software layer (such as in a mapping module in a kernel 600, which is described below), depending on the implementation. From the perspective of the guest OS, the GVPN and GPPN might be virtual and physical page numbers just as they would be if the guest OS were the only OS in the system. From the perspective of the system software, however, the GPPN is a page number that is then mapped into the physical memory space of the hardware memory as a PPN.

In some systems, such as the Workstation product of VMware, Inc., of Palo Alto, Calif., the VMM is co-resident at system level with a host operating system. Both the VMM and the host OS can independently modify the state of the host processor, but the VMM calls into the host OS via a driver and a dedicated user-level application to have the host OS perform certain I/O operations on behalf of the VM. The virtual computer in this configuration is thus fully hosted in that it runs on an existing host hardware platform and together with an existing host OS.

In other implementations, a dedicated kernel takes the place of and performs the conventional functions of the host OS, and virtual computers run on the kernel. FIG. 5 illustrates a kernel 600 that serves as the system software for several VM/VMM pairs 200/300, . . . , 200N/300N. Compared with a system in which VMMs run directly on the hardware platform, use of a kernel offers greater modularity and facilitates provisioning of services that extend across multiple VMs (for example, for resource management). Compared with the hosted deployment, a kernel may offer greater performance because it can be co-developed with the VMM and be optimized for the characteristics of a workload consisting of VMMs. The ESX Server product of VMware, Inc., has such a configuration.

A kernel-based virtualization system of the type illustrated in FIG. 5 is described in U.S. patent application Ser. No. 09/877,378 ("Computer Configuration for Resource Management in Systems Including a Virtual Machine"), now U.S. Pat. No. 6,961,941, which is incorporated here by reference. The main components of this system and aspects of their interaction are, however, outlined below.

At boot-up time, an existing operating system 420 may be at system level and the kernel 600 may not yet even be operational within the system. In such case, one of the functions of the OS 420 may be to make it possible to load the kernel 600, after which the kernel runs on the native hardware 100 and manages system resources. In effect, the kernel, once loaded, displaces the OS 420. Thus, the kernel 600 may be viewed either as displacing the OS 420 from the system level and taking this place itself, or as residing at a "sub-system level." When interposed between the OS 420 and the hardware 100, the kernel 600 essentially turns the OS 420 into an "application," which has access to system resources only when allowed by the kernel 600. The kernel then schedules the OS 420 as if it were any other component that needs to use system resources.

The OS 420 may also be included to allow applications unrelated to virtualization to run; for example, a system administrator may need such applications to monitor the hardware 100 or to perform other administrative routines. The OS 420 may thus be viewed as a "console" OS (COS). In such implementations, the kernel 600 preferably also includes a remote procedure call (RPC) mechanism to enable communication between, for example, the VMM 300 and any applications 430 installed to run on the COS 420.

In kernel-based systems such as the one illustrated in FIG. 5, there must be some way for the kernel 600 to communicate with the VMM 300. In general, the VMM 300 can call into the kernel 600 but the kernel cannot call directly into the VMM. The conventional technique for overcoming this is for the kernel to post "actions" (requests for the VMM to do something) on an action queue stored in memory 130. As part of the VMM code, the VMM looks at this queue periodically, and always after it returns from a kernel call and also before it resumes a VM. One typical action is the "raise interrupt" action: If the VMM sees this action it will raise an interrupt to the VM 200 in the conventional manner.

As is known, for example, from U.S. Pat. No. 6,397,242 (Devine, et al., 28 May 2002), some virtualization systems allow VM instructions to run directly (in "direct execution") on the hardware CPU(s) when possible. When necessary, however, VM execution is switched to the technique known as "binary translation," during which the VM is running in the VMM. In any systems where the VM is running in direct execution when it becomes necessary for the VMM to check actions, the kernel must interrupt the VMM so that it will stop executing VM instructions and check its action queue. This may be done using known programming techniques.

The kernel 600 handles not only the various VMM/VMs, but also any other applications running on the kernel, as well as the COS 420, as entities that can be separately scheduled on the hardware CPU(s) 110. In this disclosure, each schedulable entity is referred to as a "world," which contains a thread of control, an address space, machine memory, and handles to the various device objects that it is accessing. Worlds are stored in a portion of the memory space controlled by the kernel. More specifically, the worlds are controlled by a world manager, represented in FIG. 5 within the kernel 600 as module 612. Each world also has its own task structure, and usually also a data structure for storing the hardware state currently associated with the respective world.

The kernel 600 includes a memory management unit 616 that manages all machine memory that is not allocated exclusively to the COS 420. When the kernel 600 is loaded, the information about the maximum amount of memory available on the machine is available to the kernel, as well as information about how much of it is being used by the COS. Part of the machine memory is used for the kernel 600 itself and the rest is used for the virtual machine worlds.

Virtual machine worlds use machine memory for two purposes. First, memory is used to back portions of each world's memory region, that is, to store code, data, stacks, etc., in the VMM page table. For example, the code and data for the VMM 300 is backed by machine memory allocated by the kernel 600. Second, memory is used for the guest memory of the virtual machine. The memory management module may include any algorithms for dynamically allocating memory among the different VM's 200.

Interrupt and exception handling is related to the concept of "worlds" described above. As mentioned above, one aspect of switching worlds is changing various descriptor tables. One of the descriptor tables that is loaded when a new world is to be run is the new world's IDT. The kernel 600 therefore preferably also includes an interrupt/exception handler 655 that is able to intercept and handle (using a corresponding IDT in the conventional manner) interrupts and exceptions for all devices on the machine. When the VMM world is running, whichever IDT was previously loaded is replaced by the VMM's IDT, such that the VMM will handle all interrupts and exceptions.

The VMM will handle some interrupts and exceptions completely on its own. For other interrupts/exceptions, it will be either necessary or at least more efficient for the VMM to call the kernel to have the kernel either handle the interrupts/exceptions itself, or to forward them to some other sub-system such as the COS. One example of an interrupt that the VMM can handle completely on its own, with no call to the kernel, is a check-action IPI (inter-processor interrupt). One example of when the VMM preferably calls the kernel, which then forwards an interrupt to the COS, would be where the interrupt involves devices such as a mouse, which is typically controlled by the COS. The VMM may forward still other interrupts to the VM.

In the preferred embodiment of the invention, the kernel 600 is responsible for providing access to all devices on the physical machine. In addition to other modules that the designer may choose to load onto the system for access by the kernel, the kernel will therefore typically load conventional drivers as needed to control access to devices. Accordingly, FIG. 5 shows a module 610 containing loadable kernel modules and drivers. The kernel 600 may interface with the loadable modules and drivers in a conventional manner, using an application program interface (API) or similar interface.

BRIEF SUMMARY OF THE INVENTION

A computer system has secondary data that is derived from primary data. When an actor changes the primary data, the secondary data becomes incoherent relative to the primary data. One or more consumers have an interest in eliminating incoherencies between the primary data and the secondary data. A coherency event defines a point in time at which a consumer has an interest in eliminating one or more such incoherencies. When an actor makes a change to the primary data, a producer writes information regarding the change into a patch channel that can be read by one or more consumers that are interested in the primary data. At a coherency event, a consumer reads information from a patch channel and uses the information to eliminate one or more incoherencies between the primary data and the secondary data.

In some particular embodiments of the invention, a single patch channel may be shared by multiple producers, multiple consumers, or both. In other embodiments, each pair of a single producer and a single consumer has a separate patch channel that is used only by the respective producer and consumer. In some embodiments of the invention, a locking mechanism is used for each patch channel to ensure the integrity of the information provided from a producer to a consumer. In other embodiments of the invention, the patch channels are configured and used in a manner that ensures the integrity of the information, without the use of such locking mechanisms. In some particular embodiments, each patch channel comprises a set data structure stored in memory that is shared between a producer and a consumer. In some such embodiments, the set data structure comprises an array. Also, in some embodiments, the patch channels comprise a matrix of arrays, with one array for every pair of a single producer and a single consumer.

Also, in some embodiments of the invention, the primary and secondary data comprise address mappings between virtual addresses and physical addresses. In some particular embodiments, the primary data comprises address mappings in a page table and the secondary data comprises address mappings in a TLB. In other particular embodiments, the primary data comprises address mappings in a guest OS page table within a VM and the secondary data comprises address mappings (1) in a virtual TLB in the VM, (2) in a shadow page table managed by a VMM supporting the VM and (3) in a physical TLB. In still other particular embodiments, the physical computer system or a VM running on the physical computer system, or both, are multiprocessor computer systems.

BRIEF DESCRIPTION OF THE SEVERAL VIEWS OF THE DRAWING

FIG. 9 is a table illustrating the structure and content of a patch channel array according to one embodiment of this invention.

FIG. 10 is a table illustrating the structure and content of a matrix of patch channel arrays according to one embodiment of this invention.

FIG. 13A is a block diagram illustrating the use of TLB coherency patches, according to one embodiment of this invention, from all possible producers to all possible consumers in a virtual computer system.

DETAILED DESCRIPTION OF THE INVENTION

This invention relates to the issue of maintaining the coherency of data in a computer system. In broad terms, one or more consumers may have an interest in maintaining the coherency of one or more data items, which may be modified by one or more actors. A coherency event defines a particular point in time at which a consumer desires that one or more data items be coherent. For example, a consumer may have a copy of a primary datum and may want to ensure that, at a particular point in time, the copy, or secondary datum, is the same as the primary datum. When an actor modifies one or more data for which a consumer has an interest in maintaining coherency, a producer provides information to the consumer that enables the consumer to ensure the coherency of the data at a subsequent coherency event. The terms actor, consumer and producer denote functions that are performed by one or more entities within a computer system and should not be interpreted to preclude a single entity from performing multiple functions in any particular situation. For example, an actor that modifies a primary datum may also function as the producer that provides information to a consumer regarding the modification. Also, a single entity may be both a producer and a consumer for a given transaction. Thus, for example, an entity may modify a primary datum and provide information regarding the modification to all consumers of the datum, including possibly itself, so that the same entity performs the functions of actor, producer and consumer all in the same transaction. An entity that has no interest in maintaining the coherency of a particular datum is referred to as a bystander with respect to any transaction involving the datum. Thus, each relevant entity in a computer system is generally either a consumer or a bystander for any given transaction.

Figure 1:
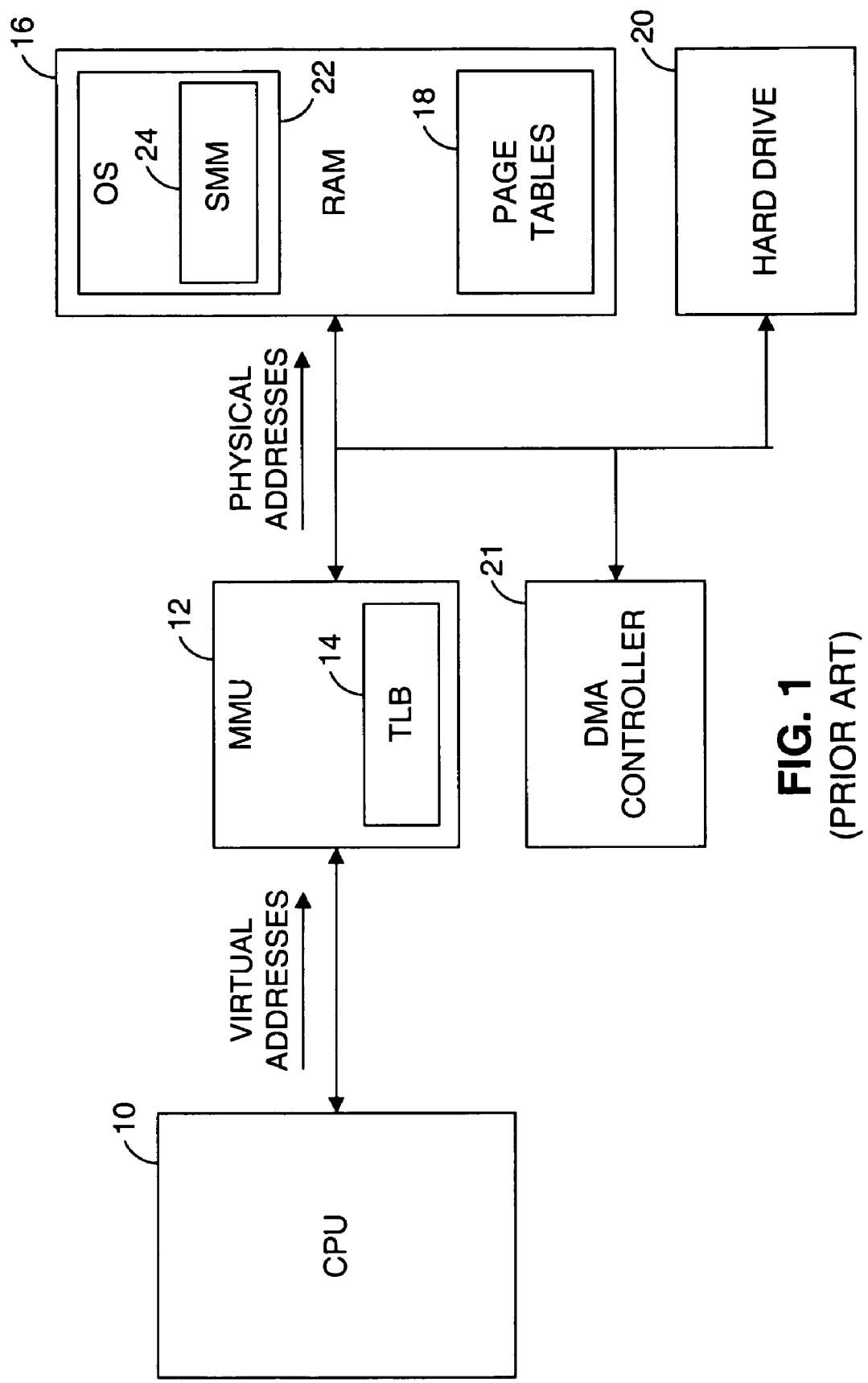
FIG. 1 is a block diagram of the major functional components of a virtual memory system in a general computer system.
Figure 2A:
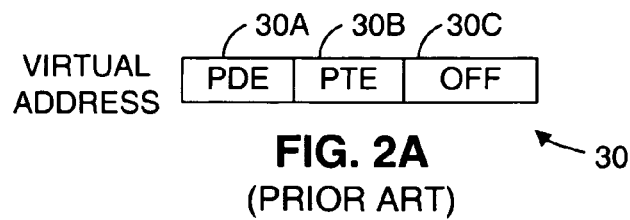
FIG. 2A is a diagram illustrating a virtual address in an x86 architecture.
Figure 2B:
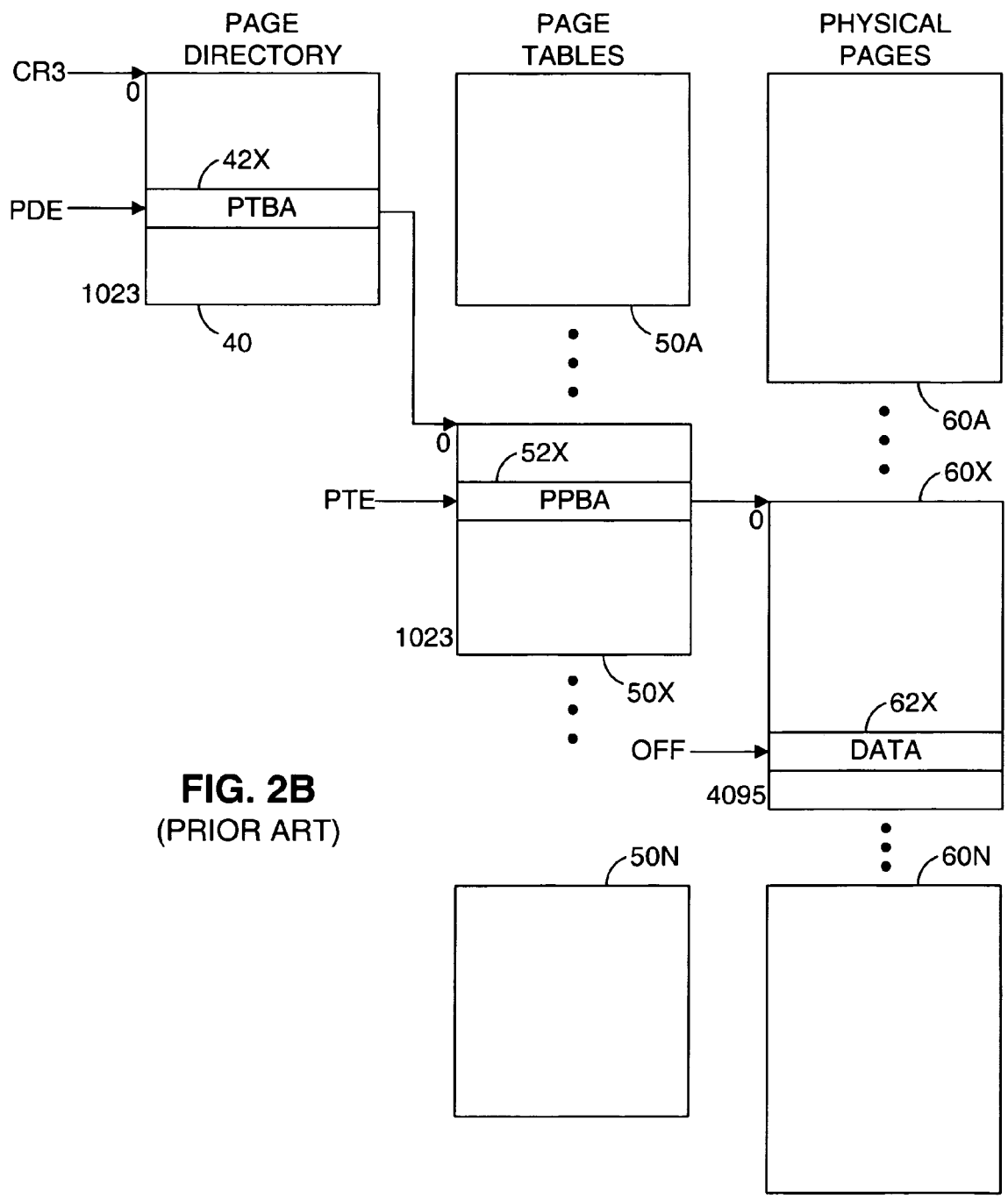
FIG. 2B is a diagram illustrating the translation of a virtual address to a corresponding physical address in an x86 computer system, using page tables.
Figure 3:
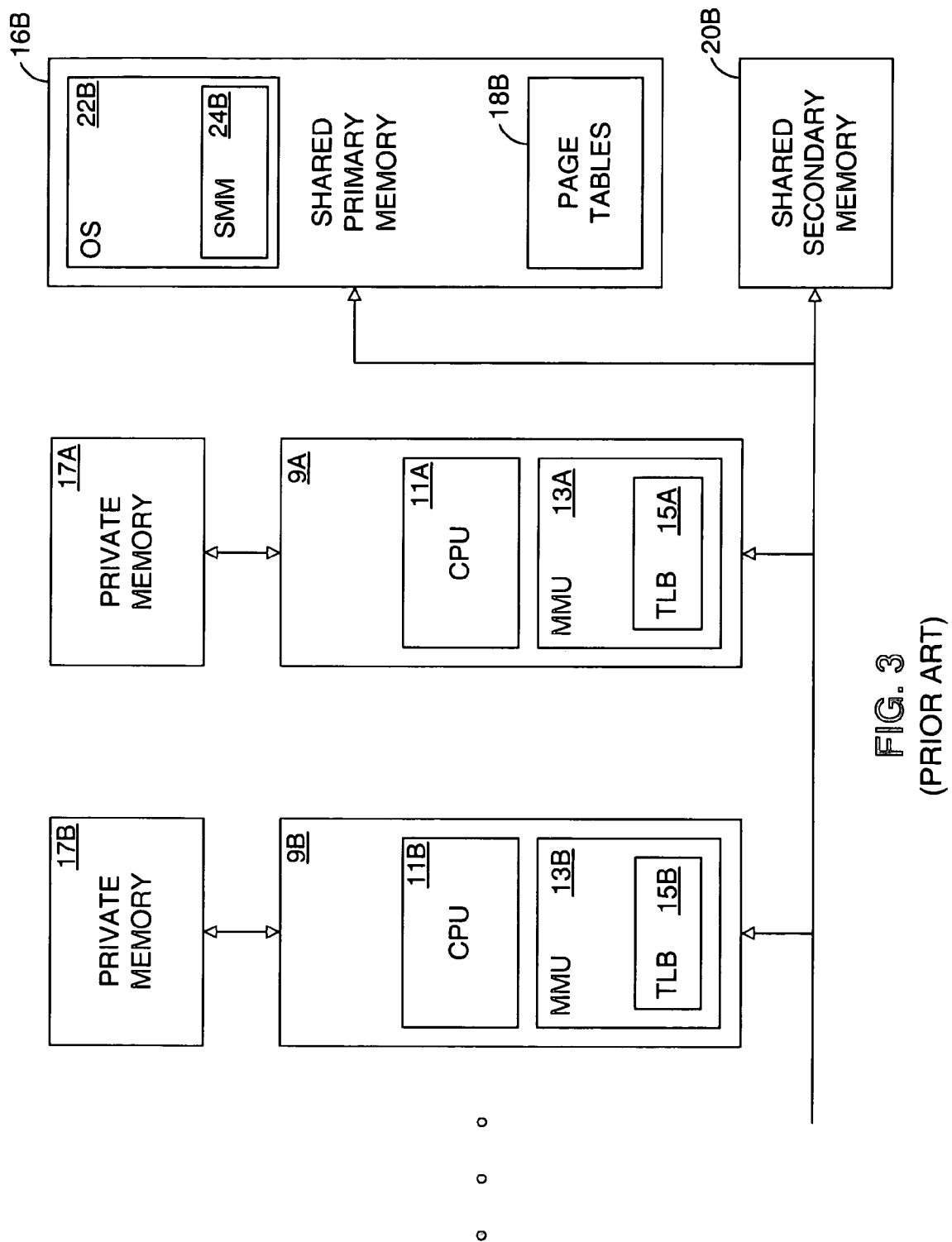
FIG. 3 is a block diagram of the major functional components of a virtual memory system in a first general multiprocessor computer system, involving separate TLBs.
Figure 4:
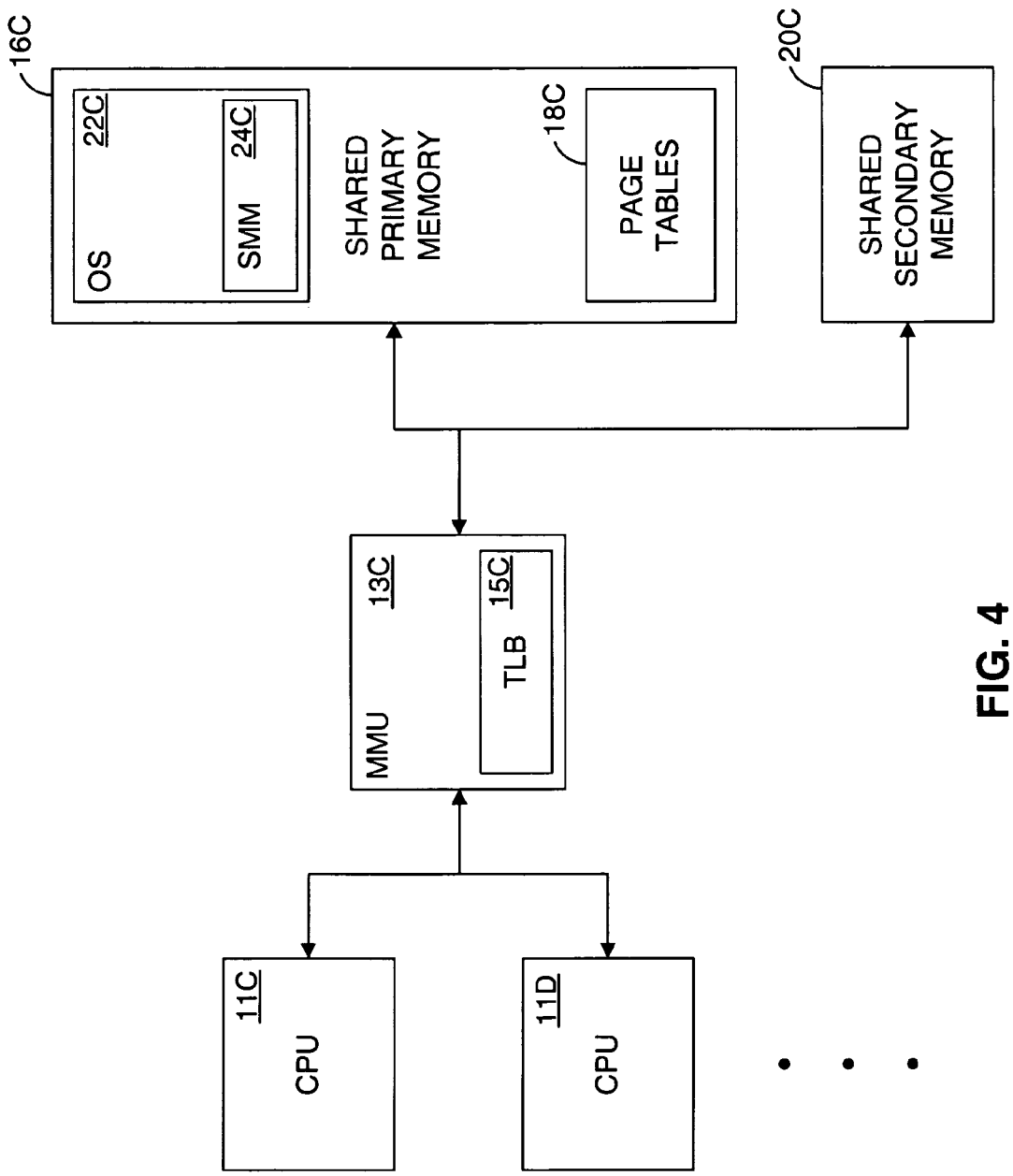
FIG. 4 is a block diagram of the major functional components of a virtual memory system in a second general multiprocessor computer system, involving a shared TLB.
Figure 5:
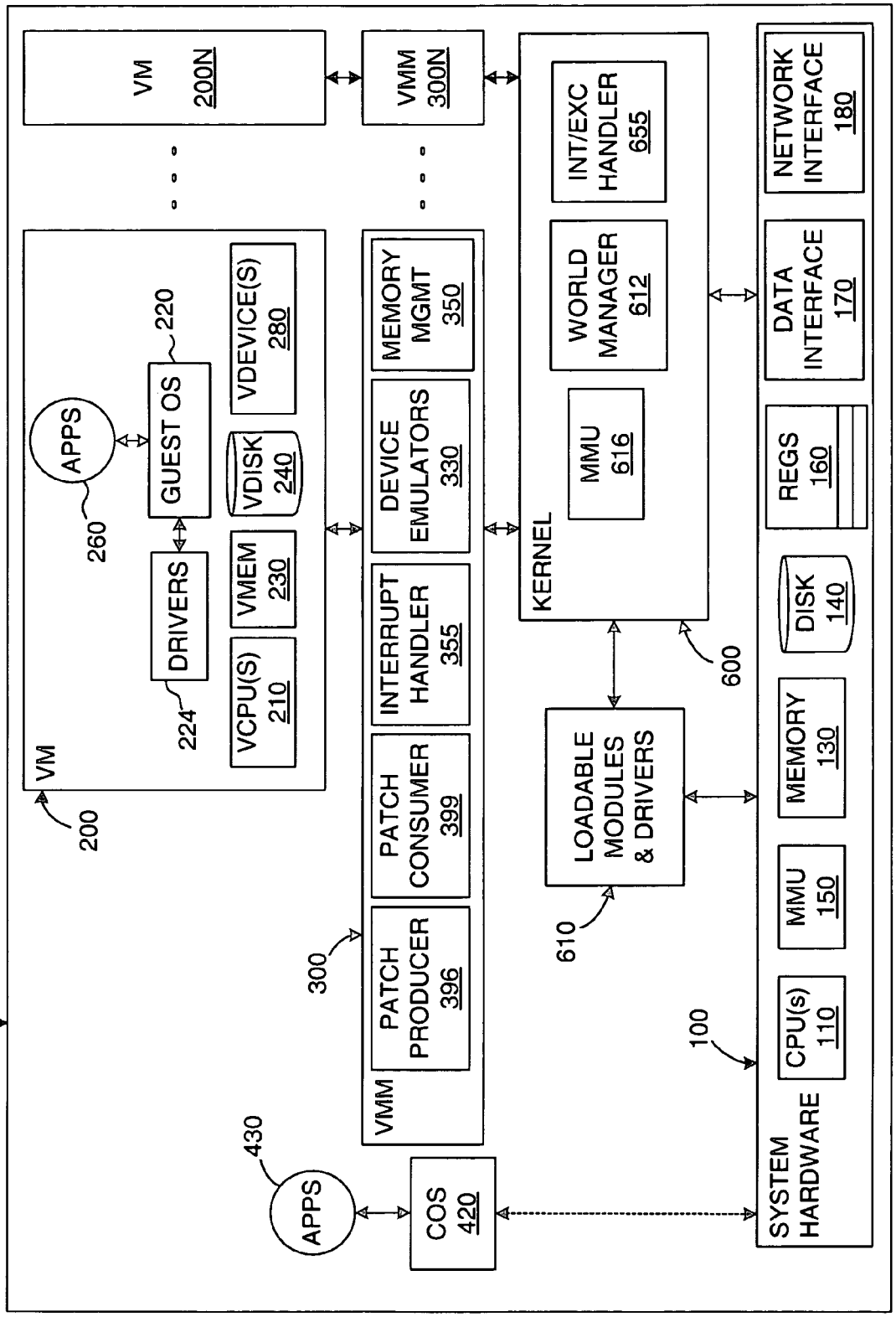
FIG. 5 is a block diagram illustrating the main components of a kernel-based, virtualized computer system.
Figure 6:
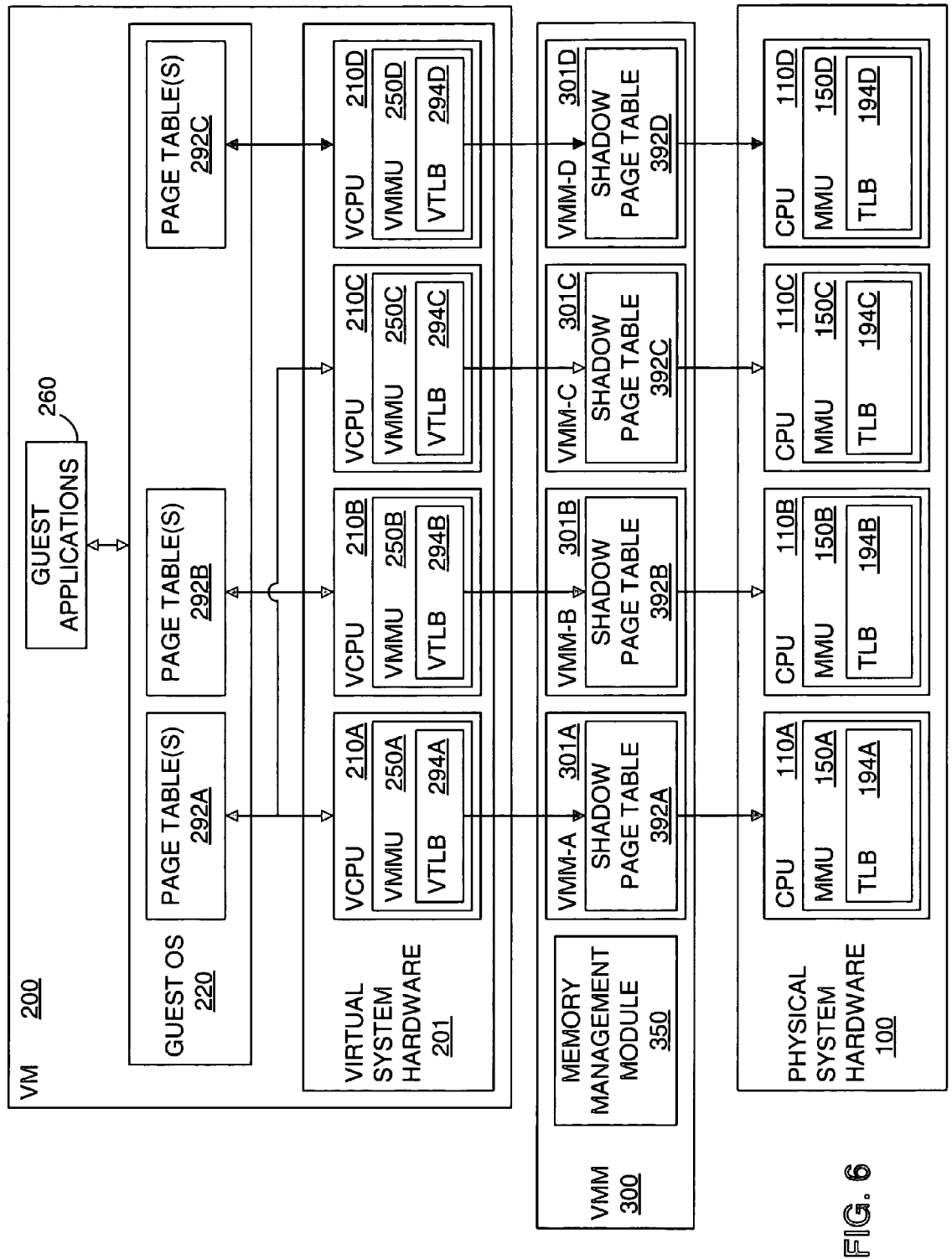
FIG. 6 is a block diagram of some of the major functional components of a multiprocessor computer system that includes a VMM that supports a multiprocessor VM.

The preferred embodiment of the invention is described in connection with a virtual computer system. In particular, the preferred embodiment is described in connection with a method and system for maintaining coherency of virtual to physical address mapping data in a virtual computer system. The preferred embodiment is described as being implemented in a virtual computer system such as the system illustrated in FIG. 5. The system illustrated in FIG. 5 is described in the Background section of this application. As described in that section, the virtual computer system 700 comprises multiple VMMs 300 to 300N, each of which supports a single VM 200 to 200N. The invention may be implemented, for example, in connection with the first VM 200 and the first VMM 300. Suppose, as an example, that the system hardware 100 includes four CPUs 110 and that the VM 200 includes four virtual CPUs (or VCPUs) 210. FIG. 6 shows some of the components of the virtual computer system 700 in such a configuration. Other components of the virtual computer system 700 are not shown in FIG. 6 for simplicity.

FIG. 6 shows the physical system hardware 100, including a first CPU 110A, a second CPU 110B, a third CPU 110C and a fourth CPU 110D. The first CPU 110A includes a first MMU 150A, which further includes a first TLB 194A. The second CPU 110B includes a second MMU 150B, which further includes a second TLB 194B. The third CPU 110C includes a third MMU 150C, which further includes a third TLB 194C. The fourth CPU 110D includes a fourth MMU 150D, which further includes a fourth TLB 194D. FIG. 6 also shows the virtual system hardware 201, including a first VCPU 210A, a second VCPU 210B, a third VCPU 210C and a fourth VCPU 210D. The first VCPU 210A includes a first virtual MMU (or VMMU) 250A, which further includes a first virtual TLB (or VTLB) 294A. The second VCPU 210B includes a second VMMU 250B, which further includes a second VTLB 294B. The third VCPU 210C includes a third VMMU 250C, which further includes a third VTLB 294C. The fourth VCPU 210D includes a fourth VMMU 250D, which further includes a fourth VTLB 294D.

As described above, the VMM 300 virtualizes the virtual system hardware 201, including the VCPUs 210A, 210B, 210C and 210D, the VMMUs 250A, 250B, 250C and 250D, and the VTLBs 294A, 294B, 294C and 294D. As shown in FIG. 6, the VMM 300 includes a plurality of subsystems or sub-VMMs, namely a VMM-A 301A, a VMM-B 301B, a VMM-C 301C and a VMM-D 301D. Each sub-VMM exports a single VCPU to the virtual system hardware 201. Thus, there is typically one sub-VMM for each VCPU 210, with each sub-VMM supporting its respective VCPU. Specifically, the VMM-A 301A supports the VCPU 210A, the VMM-B 301B supports the VCPU 210B, the VMM-C 301C supports the VCPU 210C, and the VMM-D 301D supports the VCPU 210D. Each sub-VMM may be a separate instance of a common process, for example. The sub-VMMs 301 shown in FIG. 6 may be the same as the sub-VMMs described in U.S. patent application Ser. No. 10/016,072 ("the '072 application"), entitled "System and Method for Detecting Access to Shared Structures and for Maintaining Coherence of Derived Structures in Virtualized Multiprocessor Systems," now U.S. Pat. No. 6,961,806, which is incorporated here by reference.

As also described above, the guest OS 220 is loaded onto the virtual system hardware 201 just as if it were a physical computer system, and each of the components of the virtual system hardware 201 preferably operates in the same manner as a corresponding physical component. One or more guest applications 260 may also be loaded onto the virtual system hardware 201 in a conventional manner. In this example, the physical system hardware 100 implements a conventional symmetrical multiprocessing (SMP) system and the CPUs 110A, 110B, 110C and 110D have the x86 architecture. Also, the virtual system hardware 201 implements a conventional SMP system and the VCPUs 210A, 210B, 210C and 210D also have the x86 architecture.

The guest OS 220 executes in a conventional manner on the virtual system hardware 201, and, among numerous other tasks, creates a first set of one or more page tables 292A, a second set of one or more page tables 292B and a third set of one or more page tables 292C for use by the VCPUs 210A, 210B, 210C and 210D. As illustrated in FIG. 6, at one point in time, the guest OS 220 has set up the first VCPU 210A and the third VCPU 210C to use the first set of page tables 292A, the second VCPU 210B to use the second set of page tables 292B and the fourth VCPU 210D to use the third set of page tables 292C. Thus, for example, when the first VCPU 210A executes a guest instruction that requires a translation of a first virtual address to a corresponding physical address, the first VMMU 250A may first look in the first VTLB 294A for the required translation. If the translation is not found in the VTLB 294A, then the VMMU 250A accesses the first set of page tables 292A in search of the required translation. If a valid translation is found in the page tables 292A, the VCPU 210A uses the translation to perform the required memory access and the VMMU 250A loads the translation into the VTLB 294A. In a similar manner, the second VMMU 250B looks in the second set of page tables 292B for translations needed by the second VCPU 210B and loads such translations into the second VTLB 294B; the third VMMU 250C looks in the first set of page tables 292A for translations needed by the third VCPU 210C and loads such translations into the third VTLB 294C; and the fourth VMMU 250D looks in the third set of page tables 292C for translations needed by the fourth VCPU 210D and loads such translations into the fourth VTLB 294D.

Now, as described above, the address mappings generated by the guest OS 220, which are inserted into the page tables 292A, 292B and 292C, as well as into the VTLBs 294A, 294B, 294C and 294D, provide mappings from GVPNs to GPPNs. However, the physical memory 130 must ultimately be addressed using actual physical addresses, containing PPNs. Thus, the MMUs 150A, 150B, 150C and 150D, within the physical system hardware 100, must be able to translate the GVPNs used by the guest software into PPNs used by the memory 130. As described above, the memory management module 350 within the VMM 300 converts the GPPNs used by the guest OS 220 into PPNs used by the memory 130, to derive translations from GVPNs used by guest software to PPNs used by the memory 130. More specifically, in one embodiment, the memory management module 350 generates a first shadow page table 392A for use by the first CPU 110A, a second shadow page table 392B for use by the second CPU 110B, a third shadow page table 392C for use by the third CPU 110C and a fourth shadow page table 392D for use by the fourth CPU 110D. In other embodiments, the memory management module 350 may generate other shadow page table configurations, such as configurations in which multiple CPUs share one or more shadow page tables.

The memory management module 350 populates each of these shadow page tables with mappings that translate GVPNs used by the guest software into PPNs used by the memory 130. More specifically, in the configuration of FIG. 6, the memory management module 350 populates the first shadow page table 392A and the third shadow page table 392C with address mappings that correspond with address mappings in the first guest OS page table 292A; the memory management module 350 populates the second shadow page table 392B with address mappings that correspond with address mappings in the second guest OS page table 292B; and the memory management module 350 populates the fourth shadow page table 392D with address mappings that correspond with address mappings in the third guest OS page table 292C. Thus, for example, when the first CPU 110A executes an instruction that requires a translation from a GVPN to a corresponding PPN, the first MMU 150A may first look in the first TLB 194A for the required translation. If the translation is not found in the TLB 194A, then the MMU 150A accesses the first shadow page table 392A in search of the required translation. If a valid translation is found in the shadow page table 392A, the CPU 110A uses the translation to perform the required memory access and the MMU 150A stores the translation in the TLB 194A. In a similar manner, the second MMU 150B looks in the second shadow page table 392B for translations needed by the second CPU 110B and loads such translations into the second TLB 194B; the third MMU 150C looks in the third shadow page table 392C for translations needed by the third CPU 110C and loads such translations into the third TLB 194C; and the fourth MMU 150D looks in the fourth shadow page table 392D for translations needed by the fourth CPU 110D and loads such translations into the fourth TLB 194D.

Figure 7:
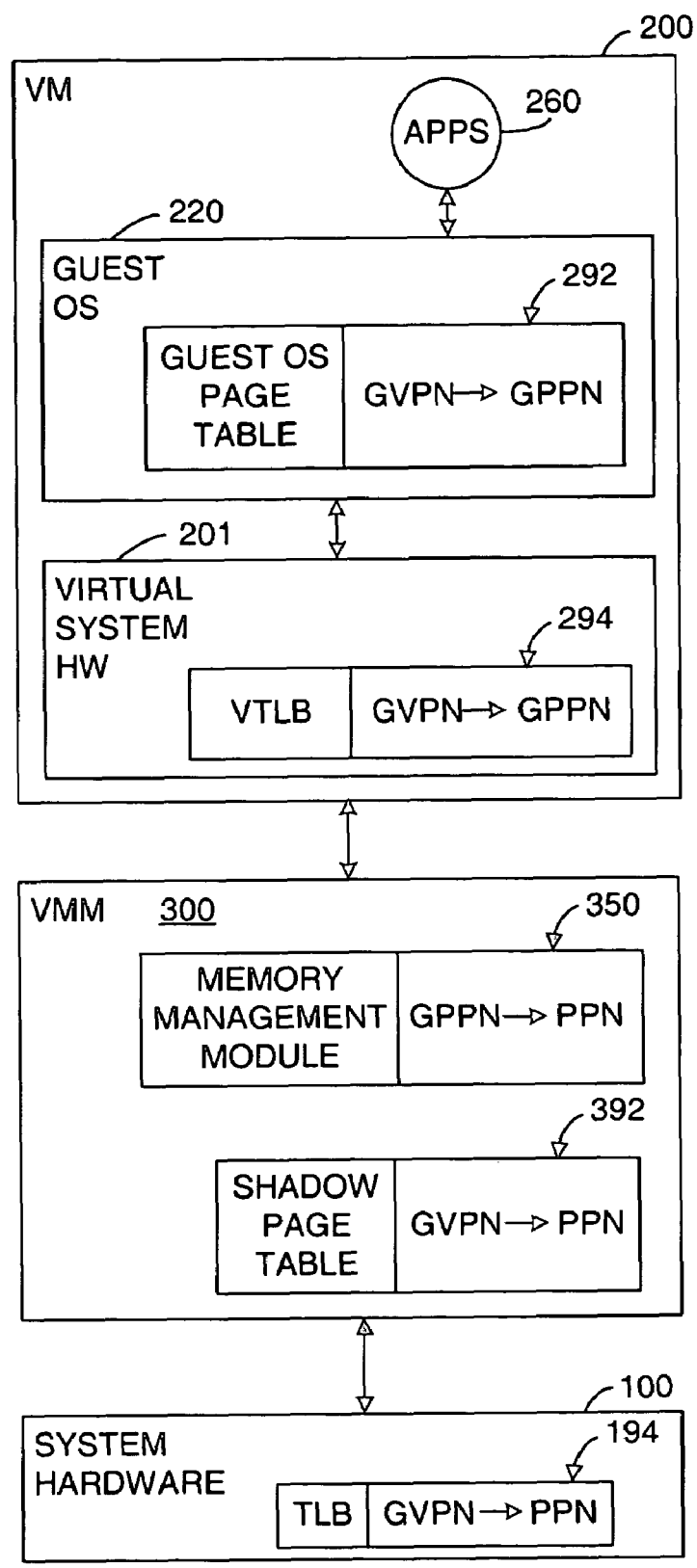
FIG. 7 is a block diagram illustrating virtual to physical address mappings that are required in a virtual computer system.

These address mappings are further illustrated in FIG. 7. The guest OS 220 generates a guest OS page table 292, which may be one of the pages tables 292A, 292B or 292C. The guest OS page table 292 contains mappings from GVPNs to GPPNs. Suppose that a guest application 260 attempts to access a memory location having a first GVPN, and that the guest OS 220 has specified in the guest OS page table 292 that the first GVPN is backed by what it believes to be a physical memory page having a first GPPN. The mapping from the first GVPN to the first GPPN is used by the virtual system hardware 201, and it is loaded into a VTLB 294, which may be one of the VTLBs 294A, 294B, 294C or 294D of FIG. 6. The memory management module 350 within the VMM 300 translates the first GPPN into a corresponding PPN, let's say a first PPN. The memory management module 350 creates a shadow page table 392, which may be one of the shadow page tables 392A, 392B, 392C or 392D of FIG. 6. The memory management module 350 inserts a translation into the shadow page table 392 mapping the first GVPN to the first PPN. This mapping from the first GVPN to the first PPN is used by the system hardware 100 and is loaded into the TLB 194, which may be one of the TLBs 194A, 194B, 194C or 194D of FIG. 6.

Referring again to FIG. 6, the address mappings contained in the guest OS page tables 292A, 292B and 292C may be considered primary data, and the address mappings contained in the VTLBs 294A, 294B, 294C and 294D, the shadow page tables 392A, 392B, 392C and 392D, and the TLBs 194A, 194B, 194C and 194D may all be considered secondary data. This secondary data should generally be kept coherent with the primary data. Thus, when a change is made to the primary data, the change should generally propagate through each of the stores of secondary data. As described above, the operation of the virtual system hardware 201 should preferably achieve at least the same level of coherency with the guest OS page tables 292A, 292B and 292C as a physical system implementing the same hardware platform would achieve.

Suppose a first thread of a guest application 260 is executing on the first VCPU 210A and that the VMM 300 is virtualizing the first VCPU 210A by executing instructions on the first CPU 110A. Also, suppose a second thread of the guest application 260 is executing on the third VCPU 210C and that the VMM 300 is virtualizing the third VCPU 210C by executing instructions on the third CPU 110C. Suppose further that the guest OS 220 has set up the first VCPU 210A and the third VCPU 210C to use the guest OS page table 292A. Suppose further that a first GVPN is mapped to a first GPPN in the guest OS page table 292A and that this mapping has been loaded into the first VTLB 294A and the third VTLB 294C. Suppose further that the first GPPN is backed in physical memory 130 by a memory page having a first PPN and that a corresponding mapping from the first GVPN to the first PPN has been loaded into the shadow page tables 392A and 392C and into the TLBs 194A and 194C. Now suppose the guest OS 220 executes momentarily on the first VCPU 210A and modifies the mapping for the first GVPN in the guest OS page table 292A so that the first GVPN is now mapped to a second GPPN, which corresponds to a second PPN in the physical memory 130. At this point, the mappings for the first GVPN in each of the secondary data stores, namely the VTLBs 294A and 294C, the shadow page tables 392A and 392C, and the TLBs 194A and 194C, are incoherent with respect to the primary data store, namely the guest OS page table 292A.

Suppose next that the first thread of the guest application 260 were to begin executing again on the first VCPU 210A. Suppose that the CPU 110A is executing instructions from the first thread of the guest application 260 when it encounters a memory reference to the first GVPN. The MMU 150A looks in the TLB 194A and finds an entry that maps the first GVPN to the first PPN. However, the entry in the guest OS page table 292A maps the first GVPN to the second GPPN, which corresponds with the second PPN. Although there is an incoherency between the TLB 194A and the page table 292A, this is not inconsistent with the virtual memory system in the virtualized hardware platform because the VTLB 294A still contains an entry that maps the first GVPN to the first GPPN, which corresponds with the first PPN. If, however, the VCPU 210A encounters an Inylpg instruction referencing an address within the first GVPN, the mapping in the VTLB 294A will be invalidated. At this point, the VTLB 294A is no longer incoherent with the guest OS page table 292A with respect to the first GVPN. Thus, at this point also, the incoherency should be eliminated from the shadow page table 392A and the TLB 194A. The Inylpg instruction is a coherency event with respect to the GVPN that is invalidated. A flushing of a VTLB is also a coherency event for all entries that are flushed from the VTLB. After a coherency event, the shadow page tables 392, the TLBs 194 and the VTLBs 294 should preferably be placed in a condition that is no less coherent than the VTLB 294 would be if the virtualized hardware platform were implemented in a physical system.

A first step that may be taken toward ensuring the coherency of the shadow page tables 392 and the TLBs 194 is to write-protect any guest OS page table entries for which a corresponding entry has been loaded into a shadow page table 392. Techniques for adding a write trace to a primary structure, such as a guest OS page table 292, are described in the '072 application. Suppose that such a write trace has been placed on the guest OS page table 292A. Now, when the guest OS 220 attempts to modify the mapping for the first GVPN in the guest OS page table 292A, a page fault occurs and the VMM 300 becomes active. The VMM 300 determines that the guest OS 220 is attempting to change the mapping for the first GVPN so that it is mapped to the second GPPN. In response, the memory management module 350 maps the second GPPN to the second PPN and modifies the shadow page table 392A so that the first GVPN maps to the second PPN, instead of to the first PPN, so that the shadow page table 392A is coherent with the guest OS page table 292A with respect to the first GVPN. Alternatively, the memory management module 350 may simply invalidate the entry for the first GVPN in the shadow page table 392A, so that the shadow page table 392A is at least not incoherent with the guest OS page table 292A with respect to the first GVPN. Similarly, the memory management module 350 may modify or invalidate the entry for the first GVPN in the TLB 194A. Now, in direct response to the attempt to write to the guest OS page table 292A, the shadow page table 392A and the TLB 194A may be made coherent with the guest OS page table 292A, or at least any incoherency may be eliminated.

Returning to the example scenario from above, suppose next that the second thread of the guest application 260, which is executing on the third VCPU 210C, attempts an access to the first GVPN. As described above, the VTLB 294C contains an entry that maps the first GVPN to the first GPPN, and the shadow page table 392C and the TLB 194C each contain an entry that maps the first GVPN to the first PPN. Thus, the memory access will be performed on the first PPN, even though the guest OS page table 292A now indicates that the access should be performed on the second GPPN, which is backed by the second PPN. Another incoherency in virtual addressing data has occurred, which is similar to the TLB incoherency situation described in the Background section of this application. This incoherency also causes data from an incorrect physical memory page to be accessed, which could result in corrupted data or other problems.

As described above, non-virtualized computer systems generally provide techniques to avoid TLB incoherencies. The x86 architecture virtualized in the virtual system hardware 201 generally relies on a TLB shootdown technique, such as the one described above. The VMM 300 preferably accurately virtualizes the VCPUs 210A, 210B, 210C and 210D, so that the guest OS 220 can implement a TLB shootdown in a conventional manner. In the preferred embodiment, the virtual system hardware 201, in response to such a TLB shootdown from the guest OS 220, functions in the same manner as a physical implementation of the same hardware platform would function. Again in the scenario above, suppose the guest OS 220 performs a TLB shootdown technique when it modifies the entry in the guest OS page table 292A. The guest OS 220 executes on the VCPU 210A and coordinates with the VCPU 210C to cause the appropriate entries in the VTLBs 294A and 294C for the first GVPN to be invalidated. After completing the TLB shootdown, the VTLBs 294A and 294C are not incoherent with the guest OS page table 292A with respect to the entry for the first GVPN. At this point, any incoherency of the shadow page tables 392A and 392C and the TLBs 194A and 194C with the guest OS page table 292A with respect to the entry for the first GVPN should also be eliminated.

One approach to eliminating the incoherency in this situation would be to extend the approach of placing a write trace on the guest OS page table 292A and perform a "shadow page table shootdown." Suppose again that a write trace is placed on the guest OS page table 292A before the guest OS 220 attempts to modify the entry for the first GVPN. In response to the resulting page fault, the memory management module 350 can invalidate or modify any corresponding entry in any of the shadow page tables 392. In this case, the memory management module 350 would invalidate or modify the entries for the first GVPN in the shadow page tables 392A and 392C. This approach could ensure that the shadow page tables 392 are not incoherent with the guest OS page tables 292. However, especially in a multiprocessor computer system, determining the shadow page tables that would be affected by a particular write to a guest OS page table and coordinating the modifications to the shadow page tables among the multiple CPUs could be a relatively complex and time consuming process. In a non-virtualized computer system, making a change to a page table requires only a single memory reference, while in a virtual computer system, implementing such a shadow page table shootdown technique, each modification of a guest OS page table 292 would require a separate execution of this complex, time consuming process. The performance of the virtual computer system would typically be seriously degraded in comparison to a comparable non-virtualized computer system. The preferred embodiment of this invention, however, provides a more efficient technique for ensuring the coherency of virtual addressing data in a multiprocessor virtual computer system.

Figure 8:
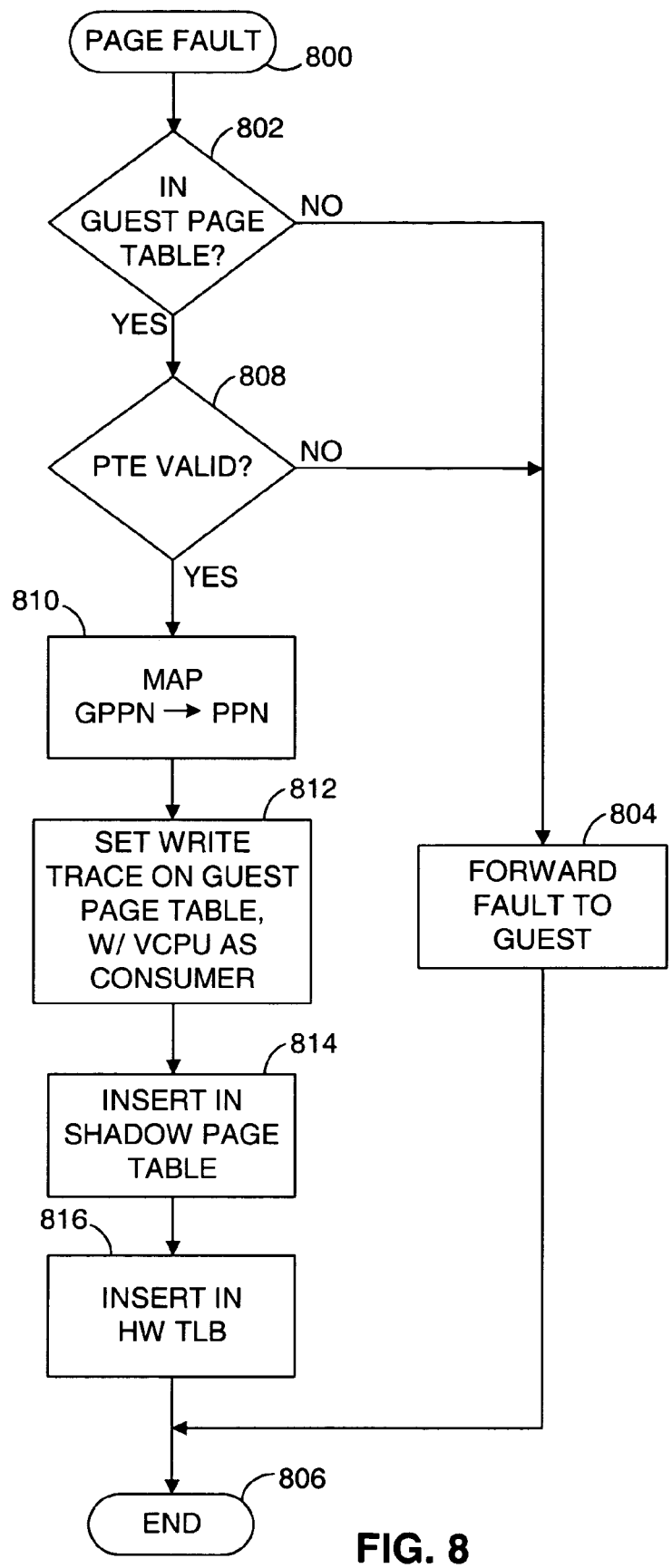
FIG. 8 is a flowchart illustrating a method for responding to a TLB Miss fault in a virtual computer system in which this invention may be implemented.

FIG. 8 is a flowchart illustrating a method that is performed in the preferred embodiment of this invention in response to a page fault, in which a virtual memory page is not present in physical memory. Suppose the same situation as described above, in which the first thread of the guest application 260 is executing on the first VCPU 210A and the second thread of the guest application 260 is executing on the third VCPU 210C. Suppose this time that the execution of the first thread leads to a memory reference to a second GVPN. Suppose that the MMU 150A does not find a mapping for the second GVPN in the TLB 194A or in the shadow page table 392A. In this case, the CPU 110A issues a page fault and the method of FIG. 8 is executed.

The method of FIG. 8 begins at an initial step 800. Next, at a step 802, the VMM 300, and, in particular, the memory management module 350, checks the guest OS page table 292A for a mapping for the second GVPN. If a mapping is found, the method of FIG. 8 proceeds to a step 808; otherwise, the method proceeds to a step 804. At the step 804, the VMM 300 forwards the page fault to the guest OS 220, just as if the page fault had occurred at the VCPU 210A. The guest OS 220 will typically respond to the page fault by placing an appropriate mapping in the guest OS page table 292A, mapping the second GVPN to a GPPN. After the step 804, the method of FIG. 8 proceeds to a step 806, at which the method terminates.

At the step 808, the memory management module 350 determines whether the mapping discovered in the step 802 is valid. A mapping may also be referred to as a page table entry. Thus, for example, during the step 802, the memory management module 350 may check to see whether the Present bit of the page table entry is set. If the page table entry is not valid, the method again proceeds to the step 804 and forwards a fault to the guest OS 220; otherwise, the method proceeds to a step 810. At the step 810, the memory management module 350 maps the GPPN to which the GVPN is mapped in the guest OS page table 292A to a PPN. If necessary, the memory management module 350 loads the GVPN from the physical disk 140 into a page of the physical memory 130. Suppose the second GVPN is mapped to a third GPPN in the guest OS page table 292A. Suppose further that the third GPPN corresponds to a third PPN in the physical memory 130. In this case, the memory management module 350 maps the second GVPN to the third PPN.

Next, at a step 812, the memory management module 350 establishes a write trace, or ensures that a write trace has already been established, on the mapping for the second GVPN in the guest OS page table 292A. The granularity for this write trace may vary in different implementations. In the preferred embodiment, the entire memory page that contains the mapping is write-protected, as the entire memory page includes mappings from the same set of page tables.

The memory management module 350 also notes that the sub-VMM for the VCPU 210A, the VMM-A 301A, is a consumer for the write trace, meaning that the VMM-A 301A is to be notified if the write trace is triggered. Although the entire page is write-protected, the VMM-A 301A is preferably only notified if a write is made to the particular page table entry of interest to the VMM-A. A few techniques for notifying consumers that such a trace has been triggered were described in the '072 application. A new technique for such notification is described below.

Next, at a step 814, the memory management module 350 inserts a page table entry into the shadow page table 392A, indicating the mapping from the second GVPN to the third PPN that was determined in the step 810. Next, at a step 816, the memory management module 350 inserts a page table entry, mapping the second GVPN to the third PPN, into the hardware TLB 194A. Next, the method of FIG. 8 terminates at the step 806.

FIGS. 9 and 10 illustrate a data structure that is used in the preferred embodiment to notify consumers of one or more data items that have been changed in a primary data store, namely one or more page table entries in one or more guest OS page tables 292 in the preferred embodiment. First, FIG. 9 shows a single patch channel 398 that is used exclusively by a single producer and a single consumer. The patch channel 398 constitutes a half-duplex communication channel from the producer to the consumer. In the preferred embodiment, the patch channel 398 comprises a set data structure stored in memory that is shared by the producer and consumer. More particularly, in the preferred embodiment, the patch channel 398 comprises a data array, although other configurations are also possible.

The patch channel 398 of the preferred embodiment has a plurality of entries or patches within the data array, with each entry comprising a page table base address (PTBA) 394B and an offset 394C. Each entry may also include a patch number 394A, a derived value 394D, a usefulness indicator 394E and/or an in-use indicator 394F. The patch number 394A may comprise a conventional array index, by which different entries within the array are specified.

The derived value 394D is a value that the producer has derived from the change that has been made to the primary data. The usefulness indicator 394E comprises information that a consumer may use to determine if the derived value 394D may be used by the consumer. In the preferred embodiment, the derived value 394D may comprise an entire page table entry that the producer has derived for use in its own shadow page table, including a PPN to which the GVPN is mapped and all associated flags. Also in the preferred embodiment, the usefulness indicator 394E comprises a trace counter that is used to count the number of traces that have been placed on any mapping in the computer system. A wide variety of other derived values 394D and usefulness indicators 394E may be used in other embodiments of the invention, so long as the derived value 394D provides some derived data that may be of some use to a possible consumer and the usefulness indicator 394E can be used by the consumer to determine whether the derived value 394D can be validly used by the consumer at the time the consumer processes the patch.

As suggested by the name, the in-use indicator 394F indicates whether the respective patch contains valid data. The in-use indicator 394F may comprise any of various data types, such as a bit, a byte, a word, etc., and the in-use indicator may contain a first value to indicate that the patch is in use or a second value to indicate that the patch is not in use. As an alternative to using a separate in-use indicator 394F, the function of this field may be combined into the PTBA field 394B, for example. Suppose there is a value for the PTBA field 394B that would not ordinarily occur. This special value may be used in the PTBA field 394B to indicate that the patch is not in use. Any other value in the PTBA field 394B indicates that the patch is in use. An indication of whether or not each patch is in use may alternatively be specified using some separate data value that is not directly associated with the patch channel 398. The PTBA 394B specifies the base address for a guest OS page table 292 for which a traced page table entry has been modified, while the offset 394C specifies the particular page table entry within the page table 292 that has been modified. The number of patches in the patch channel 398 may vary widely, depending on the implementation.

Figure 13B:
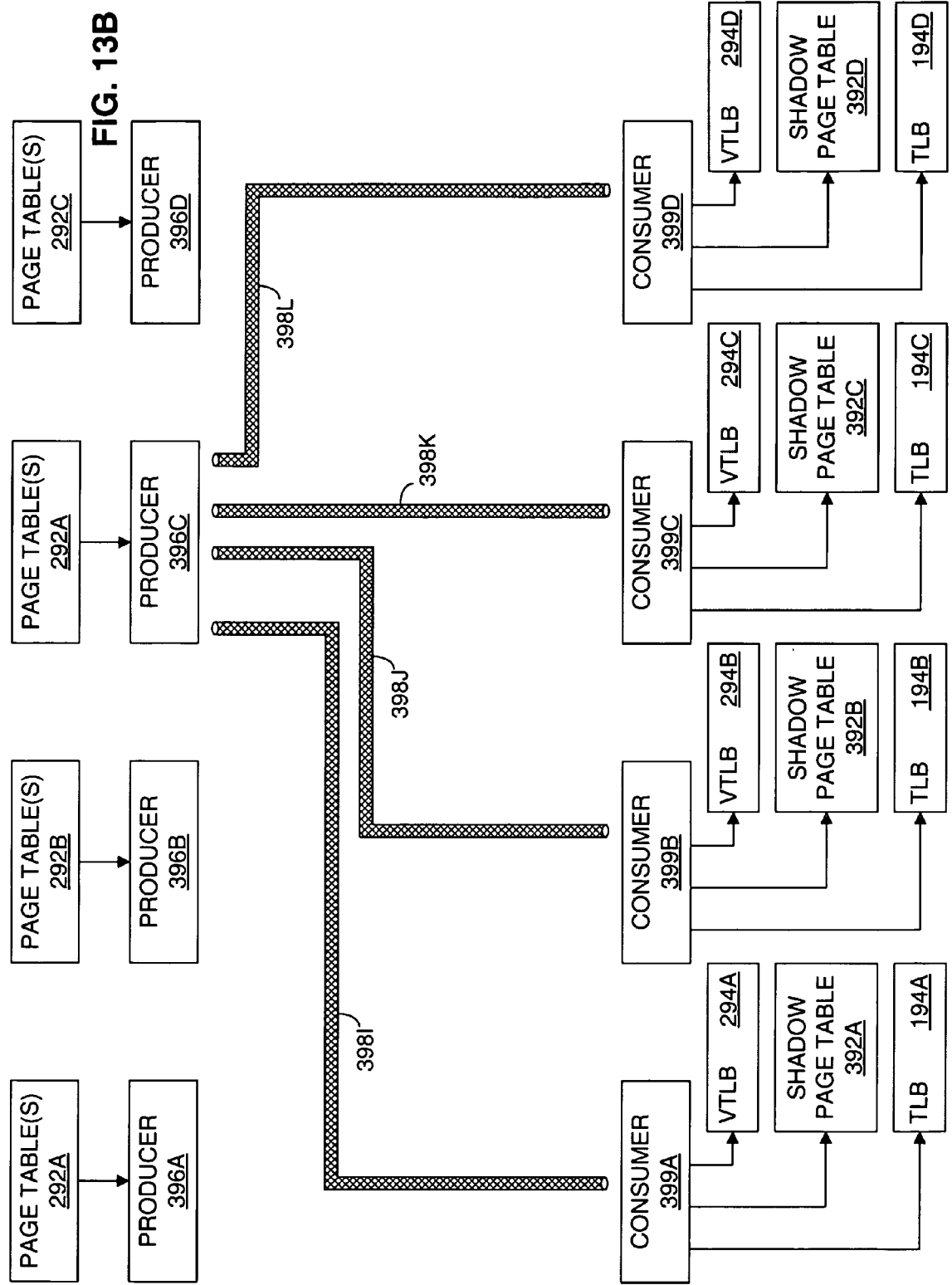
FIG. 13B is a block diagram illustrating the use of TLB coherency patches, according to one embodiment of this invention, from one producer to all possible consumers in a virtual computer system.
Figure 13C:
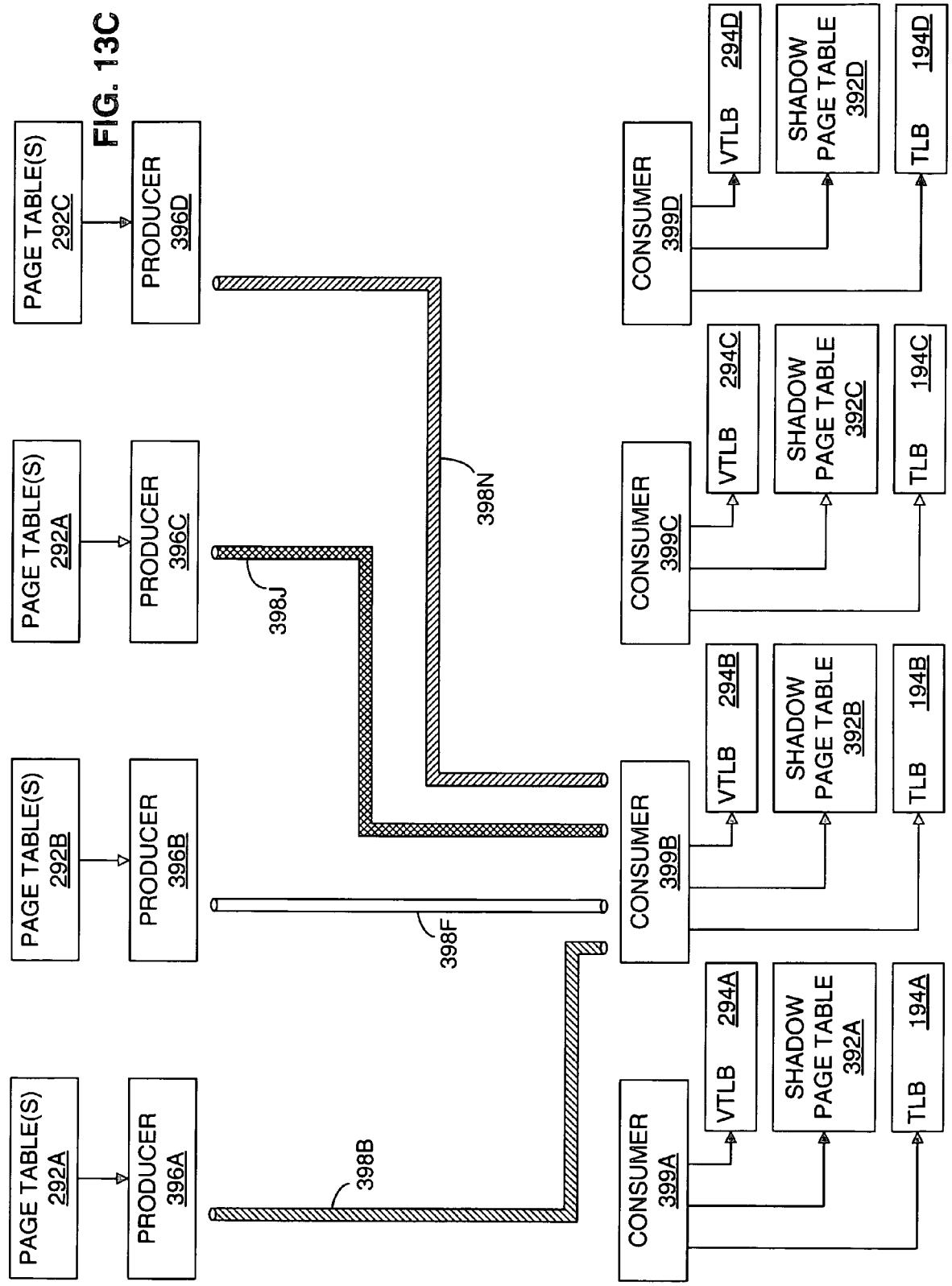
FIG. 13C is a block diagram illustrating the use of TLB coherency patches, according to one embodiment of this invention, from all possible producers to one consumer in a virtual computer system.

FIG. 10 is a table that illustrates a patch channel matrix 397 comprising a separate patch channel 398 for each combination of one producer and one consumer, including combinations in which the same entity is both the producer and the consumer. FIG. 5 shows in general terms that the VMM 300 includes a patch producer 396 and a patch consumer 399. However, in the preferred embodiment, each sub-VMM 301A, 301B, 301C and 301D comprises a patch producer 396 and a patch consumer 399. More specifically, the VMM-A 301A comprises a patch producer 396A and a patch consumer 399A, the VMM-B 301B comprises a patch producer 396B and a patch consumer 399B, the VMM-C 301C comprises a patch producer 396C and a patch consumer 399C, and the VMM-D 301D comprises a patch producer 396D and a patch consumer 399D, as illustrated in FIGS. 13A, 13B and 13C, which will be described in greater detail below.

Returning to FIG. 10, the first two columns on the left show the producers 396A, 396B, 396C and 396D, while the first two rows at the top show the consumers 399A, 399B, 399C and 399D. The remaining entries in the table of FIG. 10 show the patch channels corresponding to the respective producers 396 shown in the first two columns and the respective consumers 399 shown in the first two rows. More specifically, the third row from the top, beginning at the third column from the left and moving to the right, shows a patch channel 398A for which the VMM-A 301A is both the producer and the consumer (A2A PC), a patch channel 398B for which the VMM-A 301A is the producer and the VMM-B 301B is the consumer (A2B PC), a patch channel 398C for which the VMM-A 301A is the producer and the VMM-C 301C is the consumer (A2C PC), and a patch channel 398D for which the VMM-A 301A is the producer and the VMM-D 301D is the consumer (A2D PC). The fourth row from the top, beginning at the third column from the left and moving to the right, shows a patch channel 398E for which the VMM-B 301B is the producer and the VMM-A 301A is the consumer (B2A PC), a patch channel 398F for which the VMM-B 301B is both the producer and the consumer (B2B PC), a patch channel 398G for which the VMM-B 301B is the producer and the VMM-C 301C is the consumer (B2C PC), and a patch channel 398H for which the VMM-B 301B is the producer and the VMM-D 301D is the consumer (B2D PC). The fifth row from the top, beginning at the third column from the left and moving to the right, shows a patch channel 398I for which the VMM-C 301C is the producer and the VMM-A 301A is the consumer (C2A PC), a patch channel 398J for which the VMM-C 301C is the producer and the VMM-B 301B is the consumer (C2B PC), a patch channel 398K for which the VMM-C 301C is both the producer and the consumer (C2C PC), and a patch channel 398L for which the VMM-C 301C is the producer and the VMM-D 301D is the consumer (C2D PC). The sixth row from the top, beginning at the third column from the left and moving to the right, shows a patch channel 398M for which the VMM-D 301D is the producer and the VMM-A 301A is the consumer (D2A PC), a patch channel 398N for which the VMM-D 301D is the producer and the VMM-B 301B is the consumer (D2B PC), a patch channel 398O for which the VMM-D 301D is the producer and the VMM-C 301C is the consumer (D2C PC), and a patch channel 398P for which the VMM-D 301D is both the producer and the consumer (D2D PC). Each of the patch channels 398A to 398P shown in FIG. 10 may be substantially the same as the patch channel 398 shown in FIG. 9. For example, the A2C patch channel 398C may be an array in memory that is shared by the VMM-A 301A as producer and the VMM-C 301C as consumer.

Figure 11:
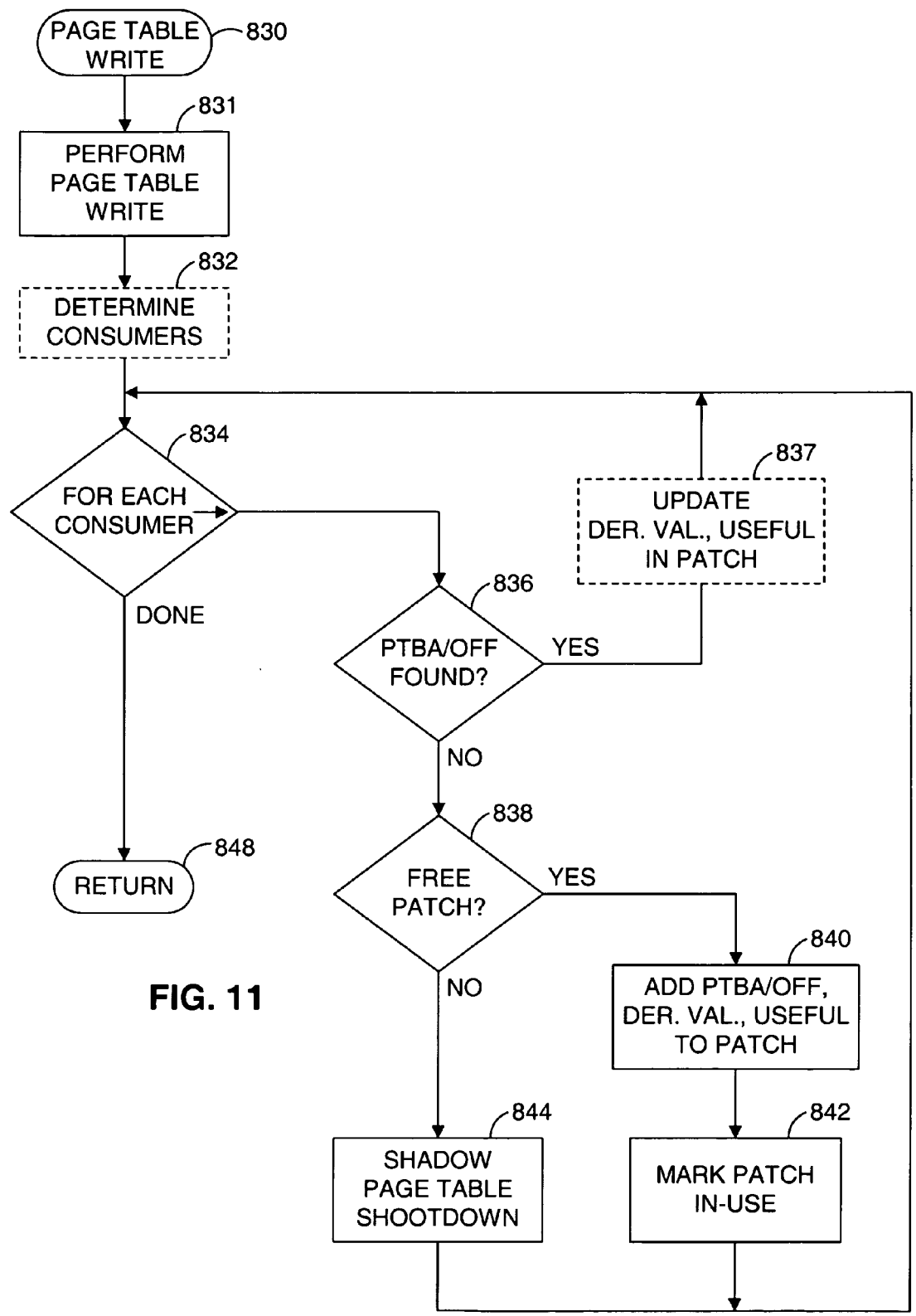
FIG. 11 is a flowchart illustrating a method according to one embodiment of this invention for responding to a write operation by a guest OS to an entry within a guest OS page table for which a corresponding entry has been inserted into a shadow page table.

FIG. 11 illustrates how a producer writes a patch to a patch channel 398. In particular, FIG. 11 illustrates how a sub-VMM 301A, 301B, 301C or 301D responds to the triggering of a write trace that has been placed on a guest OS page table 292. The method of FIG. 11 begins at an initial step 830. At this point, one of the write traces that were established at the step 812 of FIG. 8 has been triggered, causing a page fault. The page fault is handled by the sub-VMM 301A, 301B, 301C or 301D that exports the VCPU 210A, 210B, 210C or 210D which attempted the write.

Suppose again that the first thread of the guest application 260 is executing on the first VCPU 210A and the second thread of the guest application 260 is executing on the third VCPU 210C. Suppose further that, after the performance of the method of FIG. 8 in response to references to the second GVPN from within the first thread and the second thread of the first guest application 260, the guest OS page table 292A and the VTLBs 294A and 294C each contains a mapping from the second GVPN to the third GPPN, the shadow page tables 392A and 392C and the TLBs 194A and 194C each contains a mapping from the second GVPN to the third PPN, and that a write trace has been established on the guest OS page table 292A for the mapping for the second GVPN, specifying the first VCPU 210A and the third VCPU 210C as consumers. Each of the VCPUs 210A and 210C has secondary data in the respective VTLBs 294A and 294C, in the respective shadow page tables 392A and 392C, and in the respective TLBs 194A and 194C, that is derived from the primary data in the guest OS page table 292A. Now suppose the guest OS 220 executes temporarily on the first VCPU 210A and attempts to modify the mapping for the second GVPN to map it to a fourth GPPN, which corresponds with a fourth PPN. The write trace that has been placed on this mapping gives rise to a page fault, which activates the VMM-A 301A. As a result, the VMM-A 301A, and more specifically the producer 396A, performs the method of FIG. 11, beginning at the step 830.

Next at a step 831, the producer 396A performs the write to the guest OS page table 292A that was attempted by the guest OS 220, changing the page table entry for the second GVPN to map to the fourth GPPN. After the step 831, the method of FIG. 11 proceeds to an optional step 832. At the step 832, the producer 396A determines which VCPUs 210 are consumers for the write trace that has been triggered. If the optional step 832 is not performed, the method of FIG. 11 proceeds under the assumption that all VCPUs 210 are consumers. If the step 832 is not performed, all VCPUs 210 will receive information regarding changes to the primary data, and it will be up to each VCPU to determine whether the information related to each change is pertinent to the particular VCPU. The following discussion assumes that the optional step 832 is performed. In this case, for the example scenario, the producer 396A determines that the VCPU 210A and the VCPU 210C are consumers for the triggered write trace. More specifically, the producer 396A determines that the consumers 399A and 399C are consumers in this instance.

Next, at a step 834, a loop is performed once for each consumer that was determined in the optional step 832 or once for each possible consumer if the optional step 832 is not performed. Each time the loop is performed, reference is made to a patch channel 398 that is shared between the producer 396A and the consumer for which the loop is being performed. In general, the purpose of this loop is to indicate to each relevant consumer, using the respective patch channels 398, the page table entry for which the write trace was triggered. In this example, the loop will be performed once each for the consumers 399A and 399C. When the loop is performed for the consumer 399A, reference is made to the A2A patch channel 398A, while when the loop is performed for the consumer 399C, reference is made to the A2C patch channel 398C. The following discussion is also based on this ongoing example scenario.

The body of the loop begins at a step 836. At this step, the producer 396A scans the current patch channel 398 for entries that are marked as being in-use, by checking the in-use indicator field 394F, by checking for a value other than a special value in the PTBA field 394B or by some other method. The producer 396A checks all such entries that are in use to determine whether the PTBA field 394B points to the base of the page table 292A and whether the offset field 394C points to the page table entry that maps the second GVPN. If a matching, in-use entry is found, the method proceeds to an optional step 837. At the step 837, the producer 396A may, but need not, update the derived value 394D and the usefulness indicator 394E for the matching page table entry that was found in the step 836. If the derived value 394D is not updated, then the producer 396A preferably writes some value to the usefulness indicator 394E to indicate that the derived value 394D is no longer valid. For example, the producer 396A may write a zero to the usefulness indicator 394E. If the values are updated, the new page table entry for the second GVPN generated by the producer 396A for the shadow page table 392A is written into the derived value field 394D and the current trace count for the mapping is written into the usefulness indicator field 394E. After the step 837, the method returns to the step 834 to either perform the loop another time for another consumer or to end the loop after all of the relevant patch channels have been processed. If a matching patch is found at the step 836, then the existing entry already indicates that the page table entry for the second GVPN has been modified. In this case, a single page table entry in a single guest OS page table 292 has been modified multiple times since the last coherency event for the current consumer. However, these multiple modifications have been coalesced into a single patch, so that the consumer will subsequently propagate only the most recent modification into its secondary data stores. If the producer 396A updates the derived value 394D and the usefulness indicator 394E then the patch that resulted from the previous change to the page table entry for the second GVPN is completely overwritten, and only the new patch will be processed. If the producer 396A does not update the derived value 394D, then a consumer of the patch will determine that the derived value 394D is no longer useful to the consumer, based on the usefulness indicator 394E, and the derived value 394D from the patch will not be used. In effect, the consumer will still only process the most recent patch, without the benefit of the derived value 394D, because it was not provided in the most recent patch. If no matching, in-use entry is found at the step 836, the method of FIG. 11 proceeds to a step 838.

At the step 838, the producer 396A determines whether there is an entry in the current patch channel 398 that is not in use. Preferably, there are enough entries in each patch channel 398 so that the patch channels generally do not fill up. However, in the event that all the entries in the patch channel are used, the method proceeds to a step 844 and performs a shadow page table shootdown. As described above for a shadow page table shootdown, the producer 396A, along with other entities within the VMM 300, goes through a relatively time-consuming process of promptly modifying or invalidating all mappings for the second GVPN within the VTLBs 294A and 294C, the shadow page tables 392A and 392C and the TLBs 194A and 194C. After the step 844, the method of FIG. 11 returns to the step 834.

If a free patch is found at the step 838, the method proceeds to a step 840. At this step, the producer 396A writes the base address of the guest OS page table 292A into the PTBA field 394B and the offset within the page table 292A of the mapping for the second GVPN into the offset field 394C of the free patch. At this step, the producer 396A may also write into the desired value field 394D, the entire page table entry for the second GVPN that it generated for use in the shadow page table 392A. If the producer 396A does provide the desired value 394D, then the producer also writes the trace count into the usefulness indicator 394E. If the producer 396A does not provide the desired value 394D, then the producer preferably writes a value to the usefulness indicator 394E that indicates that the desired value 394D is not valid. Next, at a step 842, the producer 396A marks the entry as being in-use. If, however, a special value is used in the PTBA field 394B to indicate that an entry is not in-use, then function of the step 842 will actually be completed when the PTBA field 394B is written during the step 840 and the step 842 need not be performed separately. In any case, the entry is marked as being in-use before the method proceeds. After the step 842, the method of FIG. 11 returns to the step 834.

After the loop beginning at the step 834 has been performed once for each consumer identified in the step 832 or for all possible consumers, the method of FIG. 11 terminates at a step 848, and the guest OS 220 may continue executing again on the VCPU 210A, after the instruction that attempted to write to the guest OS page table 292A.

In this example, the loop is performed twice, once relative to the consumer 399A and the A2A patch channel 398A and once relative to the consumer 399C and the A2C patch channel 398C. Assuming that there is an available entry in each of the patch channels 398A and 398C, after the method of FIG. 11 is performed, each of the patch channels 398A and 398C will contain an entry that is marked as being in-use and that contains the base address of the guest OS page table 292A in the PTBA field 394B and the offset of the mapping for the second GVPN in the offset field 394C.

At this point in our example scenario, the entry for the second GVPN in each of the secondary data stores, namely the VTLBs 294A and 294C, the shadow page tables 392A and 392C and the TLBs 194A and 194C, is incoherent relative to the entry for the second GVPN in the guest OS page table 292A. The guest OS page table 292A maps the second GVPN to the fourth GPPN, while the VTLBs 294A and 294C map the second GVPN to the third GPPN and the shadow page tables 392A and 392C and the TLBs 194A and 194C map the second GVPN to the third PPN, which corresponds with the third GPPN. However, this incoherency is acceptable for now because the virtualized hardware platform would also be incoherent if the platform were implemented in a non-virtualized system. This incoherency would remain in the physical implementation of the virtualized hardware platform until a relevant coherency event occurs, such as the execution of an Invlpg instruction relative to the second GVPN, or a TLB flush that flushes the incoherent mapping for the second GVPN. However, not all such coherency events are relevant to all incoherencies. For example, in a multiprocessor system, the flush of a first TLB within a first CPU will not remove an incoherency in a second TLB within a second CPU. Nonetheless, when a coherency event occurs in the virtual computer system 700, appropriate incoherencies are preferably eliminated from the VTLBs 294A and 294C, the shadow page tables 392A and 392C and the TLBs 194A and 194C, so that the virtualized hardware platform achieves at least the same level of coherency as a physical implementation of the same hardware platform would achieve. At this point in the example scenario, the change that was made to the page table entry for the second GVPN in the guest OS page table 292A has not been propagated through to the VTLBs 294A and 294C, the shadow page tables 392A and 392C, and the TLBs 194A and 194C, but the identity of the modified page table entry has been posted to the A2A patch channel 398A and to the A2C patch channel 398C.

Figure 12:
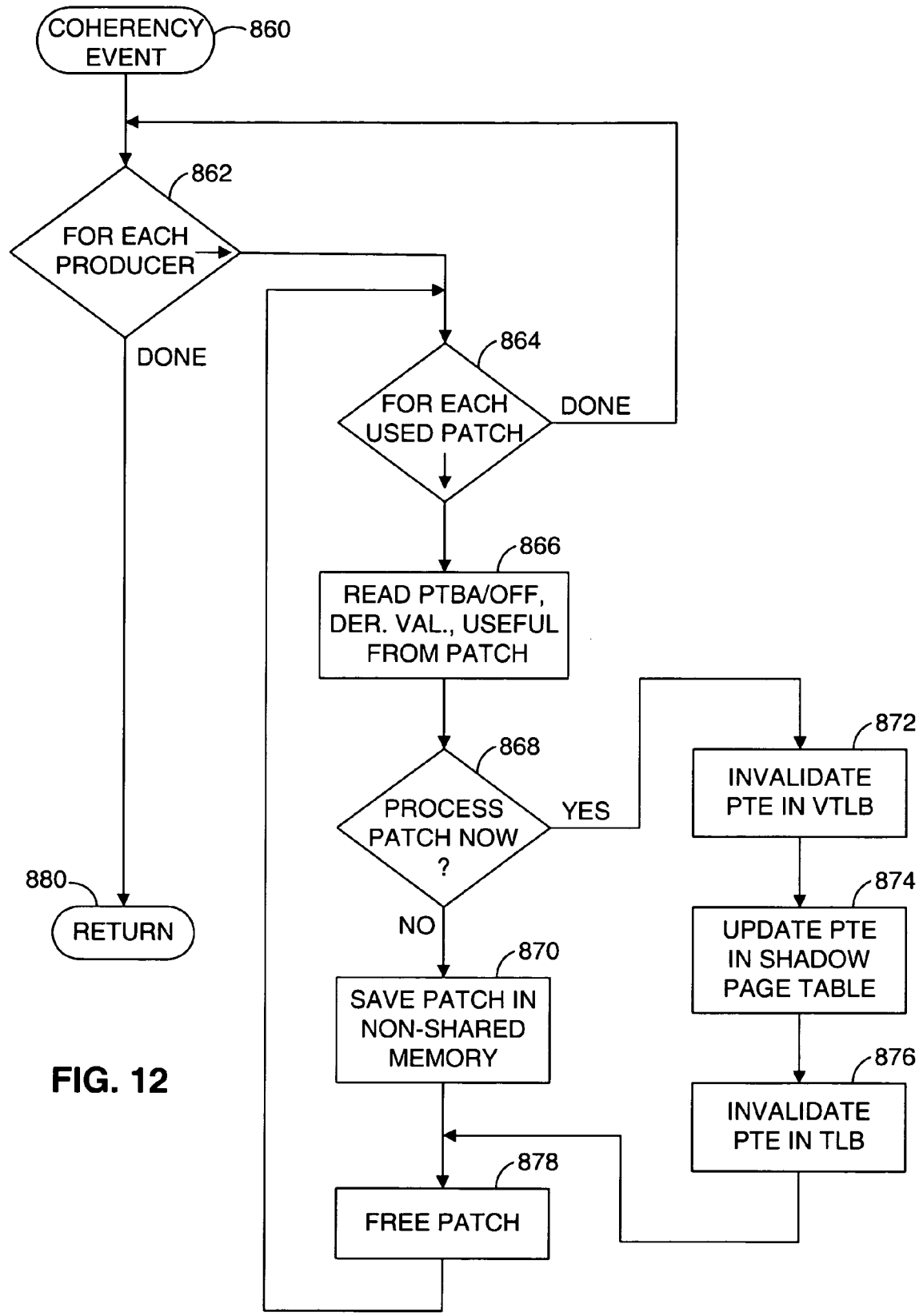
FIG. 12 is a flowchart illustrating a method according to one embodiment of this invention for responding to a TLB coherency event.

When a coherency event occurs at a VCPU 210A, 210B, 210C or 210D, a method that is illustrated in FIG. 12 is performed by the corresponding patch consumer 399A, 399B, 399C or 399D. Returning to our example scenario, after the guest OS page table 292A is modified so that the second GVPN is mapped to the fourth GPPN, suppose that the guest software executing on the VCPU 210C includes an Invlpg instruction. The VMM 300 must have or gain control of the execution of the physical CPU 110C for the Invlpg instruction. This may be accomplished, for example, by executing the guest software, including the guest OS 220, at a reduced privilege level. Attempting to execute the Invlpg instruction at a reduced privilege level results in a protection fault because the Invlpg instruction is a privileged instruction. As another alternative, the VMM 300 may perform a binary translation of the Invlpg instruction, as well as one or more surrounding guest instructions, to gain control of the execution through selection of the translated code. Once the VMM 300 gains control of the execution, the consumer 399C performs the method of FIG. 12.

The method of FIG. 12 begins at an initial step 860. Next, at a step 862, the method enters a first loop that is performed once for each patch channel 398 for which the relevant VCPU is a consumer. In the ongoing example scenario, the consumer 399C performs the first loop once for each of the patch channels 398C, 398G, 398K and 398O. In general, the purpose of this first loop is to determine all the changes that have been indicated by the relevant producer in the current patch channel 398 since the previous coherency event occurred at the consuming VCPU.

The body of the first loop begins at a step 864. At this step, the method enters a second loop that is executed once for each patch in the current patch channel 398 that is in use. The body of the second loop begins at a step 866. At this step, the consumer 399C reads the values from the PTBA field 394B, the offset field 394C, the desired value field 394D and the usefulness indicator 394E from the current patch in the current patch channel 398. The consumer 399C determines the guest OS page table 292 that is represented by the value from the PTBA field 394B and the particular page table entry within that guest OS page table that is represented by the value in the offset field 399C. For example, for the entry in the A2C patch channel 398C that indicates that the mapping for the second GVPN has changed, the value in the PTBA field 394B will point to the guest OS page table 292A and the value from the offset field 394C will point to the mapping within that table for the second GVPN.

Next, at a step 868, the consumer 399C may decide whether to process the patch now or save it for processing at some subsequent coherency event. If the current coherency event would remove an incoherency related to the patch in a physical implementation of the virtualized hardware platform, such as in the case of an Invlpg instruction affecting the same page table entry, then the patch should be processed now. Otherwise, the consumer 399C may have the option of postponing the processing of the patch. If the consumer 399C decides to postpone the processing of the patch, the method proceeds to a step 870, where the consumer 399C saves the value from the PTBA field 394B and the value from the offset field 394C into a non-shared data structure. Alternatively, the consumer 399C may not save the patch into a non-shared data structure, in which case, the patch will not be freed at a subsequent step 878, which is described below. If the consumer 399C decides to process the patch now, the method proceeds to a step 872.

At the step 872, the consumer 399C invalidates any entry in the VTLB 294C that was derived from the mapping determined at the step 866. In other embodiments, the consumer 399C may update the entry in the VTLB 294C based on the new value in the corresponding entry in the guest OS page table 292A, instead of simply invalidating the entry in the VTLB. Next, at a step 874, the consumer 399C either updates or invalidates any corresponding entry in the shadow page table 392C. The consumer 399C may compare the value from the usefulness indicator 394E with the corresponding current value to determine if the derived value 394D may be used. Thus, in the preferred embodiment, the consumer 399C may compare the value from the usefulness indicator 394E with the value of the trace counter. If the value from the usefulness indicator 394E matches the current value, then the derived value 394D may be used by the consumer 399C to determine a mapping for its shadow page table 392C. If the derived value 394D can't be used or simply isn't used, the consumer 399C can nonetheless update the corresponding entry in the shadow page table 392C based on the new value in the guest OS page table 292A and a mapping from the new GPPN to a new PPN. Next, at a step 876, the consumer 399C either invalidates any corresponding entry in the TLB 194C, or the consumer 399C updates any corresponding entry in the same manner as was used for the shadow page table 392C. In the example scenario, when the consumer 399C processes the patch from the A2C patch channel 398C that refers to the entry in the guest OS page table 292A for the second GVPN, the consumer 399C invalidates or updates the entry in the VTLB 294C for the second GVPN, the consumer 399C updates or invalidates the entry in the shadow page table 392C for the second GVPN, and the consumer 399C invalidates or updates the entry for the second GVPN in the TLB 194C. To update the entry in the VTLB 294C, the consumer 399C maps the second GVPN to the fourth GPPN; to update the entry in the shadow page table 392C, the consumer 399C maps the second GVPN to the fourth PPN; and to update the entry in the TLB 194C, the consumer 399C maps the second GVPN to the fourth PPN.

Next, at the step 878, the consumer 399C marks the current patch from the current patch channel 398 as no longer being in-use, by writing an appropriate value in the in-use indicator field 394F, by writing the special value in the PTBA field 394B or by some other means.

In the preferred embodiment, the producers 396 and the consumers 399 access the patch channels 398 in a manner that allows a producer to write to a patch channel at the same time that the consumer is reading from the patch channel, without any data races. For example, when writing a patch to a patch channel, a producer preferably marks the patch as being in-use after or at the same time as the writing of the last of the PTBA field 394B and the offset field 394C; and when reading a patch from a patch channel, a consumer preferably marks the patch as being no longer in-use after or at the same time as the reading of the last of the PTBA field 394B and the offset field 394C. In other embodiments, a mutual exclusion lock may be used in a known manner to ensure the integrity of patch data in a multiprocessor system. However, such locks may significantly delay both the writing and the reading of patches, which may incur substantial penalties in overall system performance. A mutual exclusion lock can also become a scalability bottleneck in large multiprocessor VMs, or in VMs where the guest OS page tables 292 are modified frequently.

After the step 878, the method of FIG. 12 returns to the step 864 to perform the second loop again to process another used patch or to end the second loop when all of the used patches have been processed. When the second loop ends, the method returns to the step 862 to perform the first loop again to process another patch channel 398 or to end the first loop when all of the patch channels for the consumer 399A have been processed. When the first loop ends, the method proceeds to a step 880, at which the method of FIG. 12 terminates.

After the method of FIG. 12 has been performed by the consumer 399C as described above, the VTLB 294C, the shadow page table 392C and the TLB 194C will no longer be incoherent with respect to the guest OS page table 292A, at least for all patches that were processed during the method. Thus, if the patch related to the second GVPN has been processed, then the mappings for the second GVPN in the VTLB 294C, the shadow page table 392C and the TLB 194C will be either invalid or updated to map to the fourth GPPN or the fourth PPN, as appropriate. At this point, however, the VTLB 294A, the shadow page table 392A and the TLB 194A will all still be incoherent with respect to the mapping for the second GVPN in the guest OS page table 292A. This is still acceptable, however, because the first VCPU 210A has not yet encountered a coherency event, so a physical implementation of the virtualized hardware platform would still have a similar incoherency. When a coherency event does occur at the VCPU 210A, then the consumer 399A will perform the method of FIG. 12. During this method, the consumer 399A will process the A2A patch channel 398A and encounter the patch related to the second GVPN. If the consumer 399A processes this patch, instead of postponing its processing, then the consumer 399A will either invalidate or update the mappings for the second GVPN in the VTLB 294A, the shadow page table 392A and the TLB 194A, so that the incoherencies are eliminated from these secondary data stores as well.

Now FIGS. 13A, 13B and 13C illustrate the operation of the producers 396, the consumers 399 and the patch channels 398 of the virtual computer system 700 from a different perspective. First, the primary data stores, namely the guest OS page tables 292A, 292B and 292C, are shown at the top of the figures. Below the guest OS page tables 292 are the patch producers 396A, 396B, 396C and 396D. Below the patch producers 396 are the patch channels 398. FIG. 13A shows all of the patch channels 398A to 398P, while FIG. 13B shows only the patch channels 398I, 398J, 398K and 398L, and FIG. 13C shows only the patch channels 398B, 398F, 398J and 398N. Below the patch channels 398 are the patch consumers 399A, 399B, 399C and 399D. Below the patch consumers 399 are the secondary data stores. The uppermost set of secondary data stores comprises the VTLBs 294A, 294B, 294C and 294D. Below the VTLBs 294 are the shadow page tables 392A, 392B, 392C and 392D. Below the shadow page tables 392 are the TLBs 194A, 194B, 194C and 194D.

If a VCPU 210 attempts to modify a page table entry in a guest OS page table 292 and triggers a write trace, the producer 396 for the VCPU that attempted the modification performs the method of FIG. 11 to complete the attempted modification and to add a patch to each of the patch channels 398 that belongs to the producer and that corresponds to a consumer 399 that has a trace on the modified page table entry. Thus, for example, if the third VCPU 210C attempts to modify a page table 292 and triggers a write trace, the producer 396C performs the modification and places an appropriate patch in the patch channel 398I if the consumer 399A is a consumer for the modified page table entry, in the patch channel 398J if the consumer 399B is a consumer for the modified page table entry, in the patch channel 398K if the consumer 399C is a consumer for the modified page table entry, and in the patch channel 398L if the consumer 399D is a consumer for the modified page table entry. FIG. 13B shows only these patch channels 398I, 398J, 398K and 398L to enhance the visualization of this method.

When a coherency event occurs at a VCPU 210, the consumer 399 for the VCPU at which the event has occurred performs the method of FIG. 12 to retrieve relevant patches and propagate them into its secondary data stores. Thus, for example, if a coherency event occurs at the second VCPU 210B, the consumer 399B retrieves patches from the patch channels 398B, 398F, 398J and 398N that are marked as being in use. FIG. 13C shows only these patch channels 398B, 398F, 398J and 398N to enhance the visualization of this method. The consumer 399B then uses the patches retrieved from these patch channels to invalidate or update corresponding entries in the VTLB 294B, the shadow page table 392B and the TLB 194B.

As mentioned above, the invention has primarily been described in terms of a preferred embodiment of the invention. This preferred embodiment involves a virtual computer system 700 comprising multiple physical CPUs 110 and at least one VMM 300 that exports multiple virtual CPUs 210 to a VM 200. As just one example embodiment, a virtual computer system 700 is shown as having four physical CPUs 110A, 110B, 110C and 110D and a VMM 300 that exports four virtual CPUs 210A, 210B, 210C and 210D. Numerous other virtual computer systems are also possible with a wide variety of combinations of physical CPUs 110, VMMs 300 and virtual CPUs 210, including embodiments with just a single physical CPU 110, a single virtual CPU 210, or both. Also, although the virtual computer system 700 is shown as having the architecture illustrated in FIG. 5, a wide variety of other architectures are also possible. Also, the invention may be implemented in a wide variety of physical computer systems that do not involve the virtualization of any hardware platform. Also, the invention may apply to other types of primary and secondary data, instead of page table entries in page tables and TLBs. In this case, a coherency event is still defined as a point in time at which it is desired that secondary data be made coherent with primary data, or at least a point in time at which it is desired that incoherencies be removed from the secondary data.

In addition, the actual implementation of the invention may be varied in numerous ways. The preferred embodiment uses the patch channel 398 illustrated in FIG. 9 and the patch channel matrix 397 illustrated in FIG. 10, in particular because of their integrity in a multiprocessor computer system and because of the speed at which patches may be inserted into the channels and retrieved from the channels for processing. However, the invention may also be implemented using various other means of communicating patches from producers to consumers. For example, a different patch channel may comprise a set data structure having a different configuration from that illustrated in FIG. 9. Also, the invention may be implemented using just a single patch channel that is shared by all producers and all consumers, and which is protected by a mutual exclusion lock; or it may be implemented using multiple patch channels, with a separate mutual exclusion lock for each channel.

Finally, the preferred embodiment uses the method of FIG. 11 to respond to an attempted write to a primary data store and the method of FIG. 12 to respond to a coherency event. However, each of these methods may be modified in numerous ways. For example, FIG. 11 may include the step 832, or not; the function of the step 842 may be combined into the step 840; and a lack of free patches may be handled differently from the shadow page table shootdown of the step 844. Also, in FIG. 12, the page table entries in the VTLBs may be updated instead of invalidated (see the step 872), the page table entries in the shadow page tables may be invalidated instead of updated (see the step 874) and/or the page table entries in the TLBs may be updated instead of invalidated (see the step 876). Also, a patch may alternatively be freed immediately after its values are read at the step 866. Finally, the steps 868 and 870 may be removed from the method, so that all patches are processed immediately, instead of postponing some of them.

What is claimed is:

1. A virtual computer system, the virtual computer system comprising:
    a physical computer system with a first physical processor and a second physical processor;
    a virtualization software running on the physical computer system, the virtualization software supporting a virtual machine with a first virtual processor and a second virtual processor, the virtual machine running a guest operating system (OS) with a guest OS page table, the virtualization software generating a first shadow page table and a second shadow page table derived from entries in the guest OS page table, the first shadow page table being used by the first physical processor and the second shadow page table being used by the second physical processor, the guest OS page table containing a first primary entry providing an address translation for a first virtual address and the first shadow page table containing a first derived entry that was derived from the first primary entry, the first derived entry also providing an address translation for the first virtual address, the guest OS page table also containing a second primary entry providing an address translation for a second virtual address and the second shadow page table containing a second derived entry that was derived from the second primary entry, the second derived entry also providing an address translation for the second virtual address;
    a producer associated with the first virtual processor;
    a first consumer associated with the first virtual processor;
    a second consumer associated with the second virtual processor; and
    a patch channel matrix, the patch channel matrix comprising a first patch channel by which the producer communicates information to the first consumer and a second patch channel by which the producer communicates information to the second consumer,
    wherein the producer responds to a first modification to the first primary entry, the first modification causing a first incoherency between the first primary entry and the first derived entry, the producer writing a first information to the first patch channel indicating that a change has been made to a translation in the guest OS page table for the first virtual address, the first virtual processor executing while the first incoherency exists,
    wherein the producer responds to a second modification to the second primary entry, the second modification causing a second incoherency between the second primary entry and the second derived entry, the producer writing a second information to the second patch channel indicating that a change has been made to a translation in the guest OS page table for the second virtual address, the second virtual processor executing while the second incoherency exists,
    wherein the first consumer reads the first information from the first patch channel and, on occurrence of a first coherency event at which the first shadow page table is not to be incoherent with the guest OS page table with respect to the first virtual address, the first consumer eliminates the first incoherency, and
    wherein the second consumer reads the second information from the second patch channel and, on occurrence of a second coherency event at which the second shadow page table is not to be incoherent with the guest OS page table with respect to the second virtual address, the second consumer eliminates the second incoherency.

2. The virtual computer system of claim 1, wherein the producer also provides to the first consumer a third information indicating a derived value based on the first modification and a fourth information that can be used to determine whether the third information remains valid, and the first consumer uses the third information to modify the first derived entry to make the first derived entry coherent with the first primary entry if the fourth information indicates that the third information is valid.

3. The virtual computer system of claim 2, wherein, on occurrence of the first coherency event, if the fourth information indicates that the third information is no longer valid, the first consumer eliminates the first incoherency by invalidating the first derived entry.

4. The virtual computer system of claim 2, wherein, on occurrence of the first coherency event, if the fourth information indicates that the third information is no longer valid, the first consumer determines a current value for the first primary entry and uses this current value to modify the first derived entry to make the first derived entry coherent with the first primary entry.

5. The virtual computer system of claim 2, wherein the third information and the fourth information comprise distinct data values.

6. The virtual computer system of claim 1, wherein the first coherency event comprises encountering a computer instruction that invalidates an entry within a Translation Lookaside Buffer.

7. The virtual computer system of claim 1, wherein the first coherency event comprises a situation in which a Translation Lookaside Buffer is flushed.

8. The virtual computer system of claim 1, wherein the first patch channel is used exclusively by the producer and the first consumer, and wherein the producer can write to the first patch channel at the same time that the first consumer reads from the patch channel, without any data races.

9. The virtual computer system of claim 8, wherein an entry in the first patch channel is indicated as being in-use by the producer at a point in time that is no earlier than the time when the rest of the entry is written to the first patch channel, and wherein the entry in the first patch channel is indicated as no longer being in-use by the first consumer at a point in time that is no earlier than the time when the rest of the entry is read from the first patch channel.

10. The virtual computer system of claim 1, wherein the first patch channel comprises a half-duplex communication channel that is used exclusively by the producer and the first consumer.

11. The virtual computer system of claim 10, wherein the first patch channel also comprises a set data structure stored in memory that is shared by the producer and the first consumer.

12. The virtual computer system of claim 11, wherein the set data structure comprises a data array containing a plurality of entries.

13. The virtual computer system of claim 1, wherein the first modification to the first primary entry triggers a write trace that has been placed on the guest OS page table, and the producer writes the first information to the first patch channel in response to the triggering of the write trace.

14. The virtual computer system of claim 1, wherein the first virtual address and the second virtual address are the same address and the first primary entry and the second primary entry are the same entry.

15. The virtual computer system of claim 1, wherein a single shadow page table comprises both the first shadow page table and the second shadow page table.

16. A method for maintaining coherency between address translations in a guest OS page table and address translations in shadow page tables in a virtual computer system, the virtual computer system comprising:
    a physical computer system with a first physical processor and a second physical processor;
    a virtualization software running on the physical computer system, the virtualization software supporting a virtual machine with a first virtual processor and a second virtual processor, the virtual machine running a guest operating system (OS) with a guest OS page table, the virtualization software generating a first shadow page table and a second shadow page table derived from entries in the guest OS page table, the first shadow page table being used by the first physical processor and the second shadow page table being used by the second physical processor, the guest OS page table containing a first primary entry providing an address translation for a first virtual address and the first shadow page table containing a first derived entry that was derived from the first primary entry, the first derived entry also providing an address translation for the first virtual address, the guest OS page table also containing a second primary entry providing an address translation for a second virtual address and the second shadow page table containing a second derived entry that was derived from the second primary entry, the second derived entry also providing an address translation for the second virtual address;
    a producer associated with the first virtual processor;
    a first consumer associated with the first virtual processor;
    a second consumer associated with the second virtual processor; and
    a patch channel matrix, the patch channel matrix comprising a first patch channel by which the producer communicates information to the first consumer and a second patch channel by which the producer communicates information to the second consumer,
    the method comprising:
    responding by the producer to a first modification to the first primary entry, the first modification causing a first incoherency between the first primary entry and the first derived entry, and writing by the producer a first information to the first patch channel indicating that a change has been made to a translation in the guest OS page table for the first virtual address, the first virtual processor executing while the first incoherency exists;
    responding by the producer to a second modification to the second primary entry, the second modification causing a second incoherency between the second primary entry and the second derived entry, and writing by the producer a second information to the second patch channel indicating that a change has been made to a translation in the guest OS page table for the second virtual address, the second virtual processor executing while the second incoherency exists;
    reading by the first consumer the first information from the first patch channel and, on occurrence of a first coherency event at which the first shadow page table is not to be incoherent with the guest OS page table with respect to the first virtual address, eliminating by the first consumer the first incoherency; and
    reading by the second consumer the second information from the second patch channel and, on occurrence of a second coherency event at which the second shadow page table is not to be incoherent with the guest OS page table with respect to the second virtual address, eliminating by the second consumer the second incoherency.

17. The method of claim 16, further comprising providing by the producer to the first consumer a third information indicating a derived value based on the first modification and a fourth information that can be used to determine whether the third information remains valid, and using by the first consumer the third information to modify the first derived entry to make the first derived entry coherent with the first primary entry if the fourth information indicates that the third information is valid.

18. The method of claim 16, wherein the first patch channel is used exclusively by the producer and the first consumer, and wherein the producer can write to the first patch channel at the same time that the first consumer reads from the patch channel, without any data races.

19. The method of claim 18, wherein an entry in the first patch channel is indicated as being in-use by the producer at a point in time that is no earlier than the time when the rest of the entry is written to the first patch channel, and wherein the entry in the first patch channel is indicated as no longer being in-use by the first consumer at a point in time that is no earlier than the time when the rest of the entry is read from the first patch channel.

20. The method of claim 16, wherein the first virtual address and the second virtual address are the same address and the first primary entry and the second primary entry are the same entry.

21. The method of claim 16, wherein a single shadow page table comprises both the first shadow page table and the second shadow page table.

22. A computer program embodied in a computer readable medium, the computer program being executable in a virtual computer system, the virtual computer system comprising:
a physical computer system with a first physical processor and a second physical processor; and
a virtualization software running on the physical computer system, the virtualization software supporting a virtual machine with a first virtual processor and a second virtual processor, the virtual machine running a guest operating system (OS) with a guest OS page table, the virtualization software generating a first shadow page table and a second shadow page table derived from entries in the guest OS page table, the first shadow page table being used by the first physical processor and the second shadow page table being used by the second physical processor, the guest OS page table containing a first primary entry providing an address translation for a first virtual address and the first shadow page table containing a first derived entry that was derived from the first primary entry, the first derived entry also providing an address translation for the first virtual address, the guest OS page table also containing a second primary entry providing an address translation for a second virtual address and the second shadow page table containing a second derived entry that was derived from the second primary entry, the second derived entry also providing an address translation for the second virtual address,
the computer program comprising:
a producer associated with the first virtual processor;
a first consumer associated with the first virtual processor; and
a second consumer associated with the second virtual processor,
wherein the producer, the first consumer and the second consumer use a patch channel matrix, the patch channel matrix comprising a first patch channel by which the producer communicates information to the first consumer and a second patch channel by which the producer communicates information to the second consumer,
wherein the producer responds to a first modification to the first primary entry, the first modification causing a first incoherency between the first primary entry and the first derived entry, the producer writing a first information to the first patch channel indicating that a change has been made to a translation in the guest OS page table for the first virtual address, the first virtual processor executing while the first incoherency exists,
wherein the producer responds to a second modification to the second primary entry, the second modification causing a second incoherency between the second primary entry and the second derived entry, the producer writing a second information to the second patch channel indicating that a change has been made to a translation in the guest OS page table for the second virtual address, the second virtual processor executing while the second incoherency exists,
wherein the first consumer reads the first information from the first patch channel and, on occurrence of a first coherency event at which the first shadow page table is not to be incoherent with the guest OS page table with respect to the first virtual address, the first consumer eliminates the first incoherency, and
wherein the second consumer reads the second information from the second patch channel and, on occurrence of a second coherency event at which the second shadow page table is not to be incoherent with the guest OS page table with respect to the second virtual address, the second consumer eliminates the second incoherency.

23. The computer program of claim 22, wherein the producer also provides to the first consumer a third information indicating a derived value based on the first modification and a fourth information that can be used to determine whether the third information remains valid, and the first consumer uses the third information to modify the first derived entry to make the first derived entry coherent with the first primary entry if the fourth information indicates that the third information is valid.

24. The computer program of claim 22, wherein the first patch channel is used exclusively by the producer and the first consumer, and wherein the producer can write to the first patch channel at the same time that the first consumer reads from the patch channel, without any data races.

25. The computer program of claim 24, wherein an entry in the first patch channel is indicated as being in-use by the producer at a point in time that is no earlier than the time when the rest of the entry is written to the first patch channel, and wherein the entry in the first patch channel is indicated as no longer being in-use by the first consumer at a point in time that is no earlier than the time when the rest of the entry is read from the first patch channel.

26. The computer program of claim 22, wherein the first virtual address and the second virtual address are the same address and the first primary entry and the second primary entry are the same entry.

27. The computer program of claim 22, wherein a single shadow page table comprises both the first shadow page table and the second shadow page table.

* * * * *